United States Patent
Jacob et al.

(10) Patent No.: US 10,876,681 B2
(45) Date of Patent: *Dec. 29, 2020

(54) CAMERA STAND HAVING CONSTANT RESISTANCE FOR A PORTION OF A RANGE OF MOTION ALONG AN AXIS OF ROTATION

(71) Applicant: GOOGLE LLC, Mountain View, CA (US)

(72) Inventors: Rochus Jacob, San Francisco, CA (US); Francois Rybarczyk, San Francisco, CA (US); Adam Scott Kilgore, San Rafael, CA (US); Adam Duckworth Mittleman, Redwood City, CA (US); Jason Evans Goulden, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,239

(22) Filed: Aug. 5, 2019

(65) Prior Publication Data

US 2020/0063912 A1 Feb. 27, 2020

Related U.S. Application Data

(63) Continuation of application No. 29/656,139, filed on Jul. 10, 2018, now Pat. No. Des. 855,681, which is a
(Continued)

(51) Int. Cl.
*F16M 11/20* (2006.01)
*F16M 11/04* (2006.01)
(Continued)

(52) U.S. Cl.
CPC ......... *F16M 11/2064* (2013.01); *A47B 97/00* (2013.01); *F16B 1/00* (2013.01);
(Continued)

(58) Field of Classification Search
None
See application file for complete search history.

(56) References Cited

U.S. PATENT DOCUMENTS

| 777,996 A | 12/1904 | Applegate |
| D134,016 S | 10/1942 | Du Mais |

(Continued)

FOREIGN PATENT DOCUMENTS

| CN | 201054654 | 4/2008 |
| DE | 9407862 U1 | 11/1994 |

(Continued)

OTHER PUBLICATIONS

Wasserstein Nest Cam Wall Mount review. [online] Published Sep. 13, 2016. Retrieved from URL: <http://the-gadgeteer.com/2016/09/13/wasserstein-nest-cam-wall-mount-review/>, 7 pgs.

(Continued)

*Primary Examiner* — William B Perkey
(74) *Attorney, Agent, or Firm* — Morgan, Lewis & Bockius LLP

(57) ABSTRACT

This application discloses a stand assembly that includes a receiving element for physically receiving a module, and a base assembly for supporting the receiving element. The receiving element further includes a module holding structure, an extended portion, and a first fastener structure coupled to an end of the extended portion. The base assembly includes a base, and a second fastener structure coupled to the base at a joint and configured to mate with the first fastener structure. The first fastener structure and the joint are configured to respectively provide a first degree of (Continued)

freedom of motion and a second degree of freedom of motion of the receiving element with respect to the base. The movement of the receiving element at the first degree of freedom has substantially consistent resistance through first part of a first full range of motion associated with the first degree of freedom of motion.

20 Claims, 28 Drawing Sheets

Related U.S. Application Data continuation of application No. 29/530,172, filed on Jun. 14, 2015, now Pat. No. Des. 822,749, which is a continuation of application No. 14/738,880, filed on Jun. 13, 2015, now Pat. No. 9,388,934.

(51) Int. Cl.

| | |
|---|---|
| F16M 11/10 | (2006.01) |
| F16M 13/02 | (2006.01) |
| F16M 11/08 | (2006.01) |
| F16M 11/16 | (2006.01) |
| F16M 11/22 | (2006.01) |
| F16M 11/24 | (2006.01) |
| G03B 17/56 | (2006.01) |
| A47B 97/00 | (2006.01) |
| F16B 1/00 | (2006.01) |
| H04N 5/225 | (2006.01) |

(52) U.S. Cl.
CPC ........... *F16M 11/041* (2013.01); *F16M 11/08* (2013.01); *F16M 11/105* (2013.01); *F16M 11/16* (2013.01); *F16M 11/2014* (2013.01); *F16M 11/22* (2013.01); *F16M 11/242* (2013.01); *F16M 13/02* (2013.01); *G03B 17/561* (2013.01); *H04N 5/2251* (2013.01); *H04N 5/2253* (2013.01); *H04N 5/2257* (2013.01); *A47B 2097/003* (2013.01); *F16B 2001/0035* (2013.01); *F16M 13/022* (2013.01)

(56) References Cited

U.S. PATENT DOCUMENTS

| | | |
|---|---|---|
| D162,989 S | 4/1951 | Rizzatti |
| 2,833,849 A | 5/1958 | Abel |
| D191,141 S | 8/1961 | Stevenson |
| 3,138,661 A | 6/1964 | Grashow |
| 3,428,286 A | 2/1969 | Del Pesco |
| 3,626,421 A | 12/1971 | Santana et al. |
| D227,599 S | 7/1973 | Wisgin |
| 4,083,524 A | 4/1978 | O'Connor |
| D262,041 S | 11/1981 | Schmidt |
| 4,336,916 A | 6/1982 | Blanchard |
| D275,868 S | 10/1984 | Ake |
| D290,662 S | 7/1987 | Basil et al. |
| 4,739,353 A | 4/1988 | Heuer et al. |
| 4,803,524 A | 2/1989 | Ohno et al. |
| 4,804,984 A | 2/1989 | Heuer et al. |
| 4,953,698 A | 9/1990 | Gregorich et al. |
| D311,933 S | 11/1990 | Adams |
| D359,052 S | 6/1995 | Nagele et al. |
| D367,418 S | 2/1996 | Lathrop |
| 5,523,934 A | 6/1996 | Dworman et al. |
| D371,508 S | 7/1996 | Sagol |
| 5,597,149 A | 1/1997 | Hodge |
| 5,649,256 A | 7/1997 | Wen |
| D382,287 S | 8/1997 | Palmer |
| 5,673,829 A | 10/1997 | Hartshorn |
| 5,738,321 A | 4/1998 | Moriyasu |
| 5,764,194 A | 6/1998 | Brown |
| D429,998 S | 8/2000 | Snell |
| D440,243 S | 4/2001 | Jacquet |
| D445,819 S | 7/2001 | Backs et al. |
| D450,962 S | 11/2001 | Hundley |
| D465,188 S | 11/2002 | McCoy et al. |
| D490,694 S | 6/2004 | Levine-Umans |
| D498,624 S | 11/2004 | Chen |
| D512,372 S | 12/2005 | Sakai |
| 7,126,556 B1 | 10/2006 | Wang |
| D537,668 S | 3/2007 | Murray |
| D537,856 S | 3/2007 | Tsao |
| D545,857 S | 7/2007 | Yip et al. |
| D550,488 S | 9/2007 | Nip et al. |
| 7,298,969 B2 | 11/2007 | Elberbaum |
| D558,250 S | 12/2007 | Hsia |
| 7,303,171 B1 | 12/2007 | Chen |
| D558,810 S | 1/2008 | Alden et al. |
| D565,618 S | 4/2008 | Yip et al. |
| D569,713 S | 5/2008 | Sandidge |
| D573,622 S | 7/2008 | Fisher et al. |
| D575,316 S | 8/2008 | Liu et al. |
| D577,527 S | 9/2008 | Yu |
| 7,559,518 B2 | 7/2009 | Ye |
| D600,728 S | 9/2009 | Braganca et al. |
| D602,967 S | 10/2009 | Hui |
| D613,292 S | 4/2010 | Carver |
| D621,077 S | 8/2010 | Fleischman |
| D636,174 S | 4/2011 | Smith |
| D636,513 S | 4/2011 | Furtsch |
| D638,461 S | 5/2011 | Kim et al. |
| 8,072,536 B1 | 12/2011 | Campbell |
| D662,957 S | 7/2012 | Stubel |
| D672,225 S | 12/2012 | Virnig |
| D688,289 S | 8/2013 | Hodgson |
| 8,511,625 B2 | 8/2013 | Stefan et al. |
| 8,596,890 B2 | 12/2013 | Yim et al. |
| D700,504 S | 3/2014 | Blocker |
| D719,205 S | 12/2014 | Matsumoto |
| D719,605 S | 12/2014 | Dordick |
| 8,902,355 B2 | 12/2014 | Dudkowski |
| D721,396 S | 1/2015 | Gustaveson, II |
| D726,806 S | 4/2015 | Demars |
| D726,807 S | 4/2015 | DeMars |
| 8,998,512 B1 | 4/2015 | Celler |
| D729,296 S | 5/2015 | Shelton |
| 9,057,934 B2 | 6/2015 | Lellky et al. |
| 9,071,740 B1 * | 6/2015 | Duffy .................. H04N 5/2251 |
| D734,801 S | 7/2015 | Yang |
| D740,871 S | 10/2015 | Moon et al. |
| D742,954 S | 11/2015 | Simonelli et al. |
| D746,350 S | 12/2015 | Li |
| 9,309,012 B1 | 4/2016 | Kilgore et al. |
| 9,327,851 B1 | 5/2016 | Kilgore et al. |
| 9,377,157 B1 * | 6/2016 | Kilgore ................ H04N 5/2252 |
| 9,388,934 B1 * | 7/2016 | Kilgore .................. F16M 11/22 |
| 9,415,921 B2 | 8/2016 | Marchetti et al. |
| 9,423,672 B1 | 8/2016 | Kilgore et al. |
| D775,682 S | 1/2017 | Ou et al. |
| D775,684 S | 1/2017 | Jacob et al. |
| D784,434 S | 4/2017 | Benedetti |
| D785,693 S | 5/2017 | Kim |
| 9,718,182 B2 | 8/2017 | Azhocar |
| D798,360 S | 9/2017 | Jeong |
| D801,406 S | 10/2017 | Jeong et al. |
| 9,838,577 B2 | 12/2017 | Tompkins et al. |
| D813,289 S | 3/2018 | Laffon de Mazieres et al. |
| D814,544 S | 4/2018 | Moon et al. |
| D815,177 S | 4/2018 | Jeong |
| D828,425 S | 9/2018 | Piekarski et al. |
| D828,426 S | 9/2018 | Li |
| 2001/0020975 A1 | 9/2001 | Kerai et al. |
| 2003/0161623 A1 | 8/2003 | Saruhashi |
| 2003/0201371 A1 | 10/2003 | Zadok |
| 2005/0122424 A1 | 6/2005 | Overstreet |
| 2006/0113214 A1 | 6/2006 | Shimizu et al. |
| 2007/0152117 A1 | 7/2007 | Byrd |
| 2007/0278366 A1 | 12/2007 | McGill |
| 2007/0284496 A1 | 12/2007 | Yokota |
| 2008/0061199 A1 | 3/2008 | Chen |

(56) References Cited

U.S. PATENT DOCUMENTS

| | | |
|---|---|---|
| 2008/0068493 A1 | 3/2008 | Hida et al. |
| 2008/0093514 A1 | 4/2008 | Carnevali |
| 2009/0308993 A1 | 12/2009 | Chang |
| 2011/0163211 A1 | 7/2011 | Cicco |
| 2012/0043439 A1 | 2/2012 | Liao |
| 2013/0010143 A1 | 1/2013 | Phillips |
| 2013/0193288 A1 | 8/2013 | Congdon |
| 2013/0215322 A1 | 8/2013 | Haler |
| 2013/0244816 A1 | 9/2013 | Lignelli et al. |
| 2013/0270317 A1 | 10/2013 | Wang |
| 2013/0279098 A1 | 10/2013 | Cho |
| 2013/0292531 A1 | 11/2013 | Schaefer et al. |
| 2014/0125824 A1 | 5/2014 | Takizawa |
| 2014/0226061 A1 | 8/2014 | Kuehl et al. |
| 2015/0122852 A1 | 5/2015 | Feng |
| 2015/0198865 A1 * | 7/2015 | Chang .................. F16M 11/14 396/428 |
| 2016/0296002 A1 | 10/2016 | Srey |
| 2016/0353867 A1 | 12/2016 | Due |

FOREIGN PATENT DOCUMENTS

| | | |
|---|---|---|
| DE | 202012101588 U1 | 7/2012 |
| EP | 1292126 A1 | 12/2003 |
| WO | WO 2013/133461 A1 | 9/2013 |
| WO | WO 2015/021695 A1 | 2/2015 |

OTHER PUBLICATIONS

Nest-Cam Security Camera—Black/Silver. [online] Retrieved May 16, 2017 from URL: <http://www.bestbuy.com/site/nest-cam-security-camerablacksilver/6473147.p?skuId=6473147&extStoreId=&ref=212&loc=1&ksid=7db5bd2d%C2cY0AD2404"YoC2%AD41d3cY0C2"YoAD86b9cY0C2cY0AD"Y0E2')/080%A61/3>, 3 pgs.

Google LLC, International Preliminary Report on Patentability, PCT/US2016/037266, dated Dec. 19, 2017, 7 pgs.

* cited by examiner

CAMERA STAND HAVING CONSTANT RESISTANCE FOR A PORTION OF A RANGE OF MOTION ALONG AN AXIS OF ROTATION

RELATED APPLICATIONS

The present application claims priority to and is a continuation of U.S. Design patent application Ser. No. 29/656,139, entitled "Camera," filed on Jul. 10, 2018, which claims priority to and is a continuation of U.S. Design patent application Ser. No. 29/530,172, entitled "Camera," filed on Jun. 14, 2015, now issued as U.S. Design Pat. No. D822,749, which claims priority to and is a continuation of U.S. patent application Ser. No. 14/738,880, entitled "Camera Stand Having Constant Resistance for a Portion of a Range of Motion Along an Axis of Rotation," filed on Jun. 13, 2015, now issued as U.S. Pat. No. 9,388,934, each of which is hereby incorporated by reference in its entirety.

This application is related to the following U.S. Patent Applications, each of which is hereby incorporated by reference in its entirety:

- U.S. patent application Ser. No. 15/714,894, filed Sep. 25, 2017, entitled "Camera Stand Having Constant Resistance for a Portion of a Range of Motion along an Axis of Rotation," now issued as U.S. Pat. No. 10,240,713;
- U.S. patent application Ser. No. 15/188,926, filed Jun. 21, 2016, entitled "Camera Stand Having a Magnetically Coupleable Base," now issued as U.S. Pat. No. 9,631,767;
- U.S. patent application Ser. No. 15/167,693, filed May 27, 2016, entitled "Camera Stand Having an Unlimited Range of Motion Along an Axis of Rotation," now issued as U.S. Pat. No. 9,625,792;
- U.S. patent application Ser. No. 15/097,211, filed Apr. 12, 2016, entitled "Method of Packaging Camera Facilitating Ease of Installation," now issued as U.S. Pat. No. 9,527,614;
- U.S. patent application Ser. No. 14/738,915, filed Jun. 14, 2015, entitled "Method of Packaging Camera Facilitating Ease of Installation," now issued as U.S. Pat. No. 9,327,851;
- U.S. patent application Ser. No. 14/738,912, filed Jun. 14, 2015, entitled "Camera Stand Having an Unlimited Range of Motion Along an Axis of Rotation," now issued as U.S. Pat. No. 9,772,063;
- U.S. patent application Ser. No. 14/738,911, filed Jun. 14, 2015, entitled "Camera Stand Having Constant Resistance for a Portion of a Range of Motion along an Axis of Rotation," now issued as U.S. Pat. No. 9,423,672;
- U.S. patent application Ser. No. 14/738,885, filed Jun. 13, 2015, entitled "Camera Stand Having an Unlimited Range of Motion Along an Axis of Rotation," now issued as U.S. Pat. No. 9,377,157;
- U.S. patent application Ser. No. 14/738,882, filed Jun. 13, 2015, entitled "Method of Packaging Camera Facilitating Ease of Installation," now issued as U.S. Pat. No. 9,309,012;
- U.S. patent application Ser. No. 29/530,171, entitled "Stand Assembly," filed on Jun. 14, 2015, now issued as U.S. Design Pat. No. D775,684;
- U.S. patent application Ser. No. 29/530,170, entitled "Receiving Element of a Camera Stand," filed on Jun. 14, 2015, now issued as U.S. Design Pat. No. D807,948; and
- U.S. patent application Ser. No. 29/530,169, entitled "Camera Stand Base," filed on Jun. 14, 2015, now issued as U.S. Design Pat. No. D800,824.

TECHNICAL FIELD

This relates generally to an assembly, including but not limited to methods and systems for mechanically supporting an electronic device and providing one or more degrees of freedom of motion to the electronic device.

BACKGROUND

A smart home environment is created at a venue by integrating a plurality of smart devices, including intelligent, multi-sensing, network-connected devices, seamlessly with each other in a local area network and/or with a central server or a cloud-computing system to provide a variety of useful smart home functions. Sometimes, the smart home environment includes one or more network-connected cameras that are configured to provide video monitoring and security in the smart home environment. These smart devices (e.g., the network-connected cameras) are normally placed on surfaces or mounted on walls at different locations of the smart home environment. As such, each smart device must include a base that could match and come into contact with different types of surfaces including a desktop, the wall or other surfaces. It would be beneficial to mechanically couple a smart device to its base in a compact and robust manner, while maintaining at least one or more degrees of freedom of motion for the smart device.

SUMMARY

Accordingly, there is a need for a compact and robust stand assembly that can support an electronic device and provide one or more degrees of freedom of motion to the electronic device. In various implementations of this application, a module (i.e., an electronic device) is mounted on a stand assembly that further includes a receiving element and a base assembly. The receiving element physically receives the module and is mechanically coupled to the base assembly using matching fastener structures. The base assembly further includes a base shaped to rest against a supporting surface, and a joint where one of the matching fastener structures is located. The matching fastener structures and the joint of the stand are configured to provide two independent degrees of freedom of motion of the receiving element with respect to the base of the base assembly.

In accordance with one aspect of this application, a stand assembly includes a receiving element for physically receiving a module, and a base assembly for supporting the receiving element. The receiving element further includes a module holding structure configured to hold the module, an extended portion that extends from the module holding structure, and a first fastener structure coupled to an end of the extended portion located opposite another end of the extended portion that extends from the module holding structure. The base assembly further includes a base shaped to rest against a supporting surface, and a second fastener structure coupled to the base at a joint, and the second fastener structure is configured to mate with the first fastener structure. The first fastener structure and the joint are configured to provide a first degree of freedom of motion and a second degree of freedom of motion of the receiving element with respect to the base, respectively. The movement of the receiving element at the first degree of freedom has substantially consistent resistance through first part of a first full range of motion associated with the first degree of freedom of motion, and the movement of the receiving element at the second degree of freedom has substantially consistent resistance through a second full range of motion associated with the second degree of freedom.

In accordance with another aspect of this application, a stand assembly includes a receiving element for physically receiving a module, and a base assembly for supporting the receiving element. The receiving element further includes a module holding structure configured to hold the module, an extended portion that extends from the module holding structure, and a first fastener structure coupled to an end of the extended portion located opposite another end of the extended portion that extends from the module holding structure. The base assembly further includes a base shaped to rest against a supporting surface, and a second fastener structure coupled to the base at a joint, and the second fastener structure is configured to mate with the first fastener structure. The first fastener structure and the joint are configured to provide a first degree of freedom of motion and a second degree of freedom of motion of the receiving element with respect to the base, respectively. The movement of the receiving element at the first degree of freedom is unlimited in a first direction of travel associated with the first degree of freedom, and the movement of the receiving element at the second degree of freedom is limited in a direction of travel associated with the second degree of freedom.

In some implementations, the first degree of freedom is associated with a reverse direction of travel that is opposite to the first direction of travel associated with the unlimited movement at the first degree of freedom, and the first and second fastener structures are unfastened when the receiving element moves with respect to the base assembly in the reverse direction of travel associate with the first degree of freedom.

In accordance with an aspect of this application, a method of packaging an assembly includes providing a base assembly that includes a base and a second fastener structure. The second fastener structure is coupled to the base at a joint. The method of packaging the assembly further includes attaching to the base assembly a receiving element that is configured to physically receive a module and includes a first fastener structure. Attaching to the base assembly the receiving element further includes tightening the first fastener structure onto the second fastener structure until the first fastener structure reaches a tightened position. The first fastener structure of the receiving element and the joint of the base assembly are configured to provide a first degree of freedom of motion and a second degree of freedom of motion of the receiving element with respect to the base assembly, respectively. The method of packaging the assembly further includes after determining that the first fastener structure reaches the tightened position, rotating the receiving element reversely at the first degree of freedom of motion by a first angle to orient the receiving element to a nominal position. At the nominal position, the receiving element and the module received thereby are configured to face substantially up when they are flipped down via the joint at the second degree of freedom of motion In accordance with another aspect of this application, a method of packaging an assembly includes providing a base assembly that includes a base and a second fastener structure. The second fastener structure is coupled to the base at a joint. The method of packaging the assembly further includes attaching to the base assembly a receiving element that is configured to physically receive a module and includes a first fastener structure. The first fastener structure is configured to mate with the second fastener structure and provide a first degree of freedom of motion of the receiving element with respect to the base, and the movement of the receiving element at the first degree of freedom is unlimited in a first direction of travel associated with the first degree of freedom of motion. The joint is configured to provide a second degree of freedom of motion of the receiving element with respect to the base. The method of packaging the assembly further includes rotating the receiving element along the first direction of travel associated with the first degree of freedom until the receiving element reaches a nominal position. At the nominal position, the receiving element and the module received thereby are configured to face substantially up when they are flipped down via the joint at the second degree of freedom of motion.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

In accordance with various implementations of the present invention, a stand assembly is applied to support an electronic device at different locations in a smart home environment. The electronic device includes, but is not limited to, a surveillance camera, a microphone, a speaker, a thermostat, a hazard detector, or other types of smart devices. The stand assembly includes a receiving element for physically receiving the electronic device, and a base assembly for supporting the receiving element and the electronic device mounted thereon. The stand assembly is configured to provide at least two degrees of freedom of motion such that the receiving element and the electronic device mounted thereon can be oriented differently with respect to the base assembly. In some implementations, the two degrees of freedom of motion allow the receiving element and the electronic device mounted thereon to flip down and lie substantially in parallel with a bottom surface of the base assembly, and therefore, the stand assembly and the electronic device can be packaged within a shipping box in a compact, reliable and consistent manner. Also, such consistent packaging ensures that the electronic device when removed from a package will provide an optimal and consistent range of adjustability to reduce customer frustration and improve likelihood of customer success with the product. Further, in some implementations, the stand assembly offers a high aesthetic level in product design by hiding fastener structures used to assemble the stand assembly and rendering them structurally invisible to a user of the electronic device.

Figure 1:
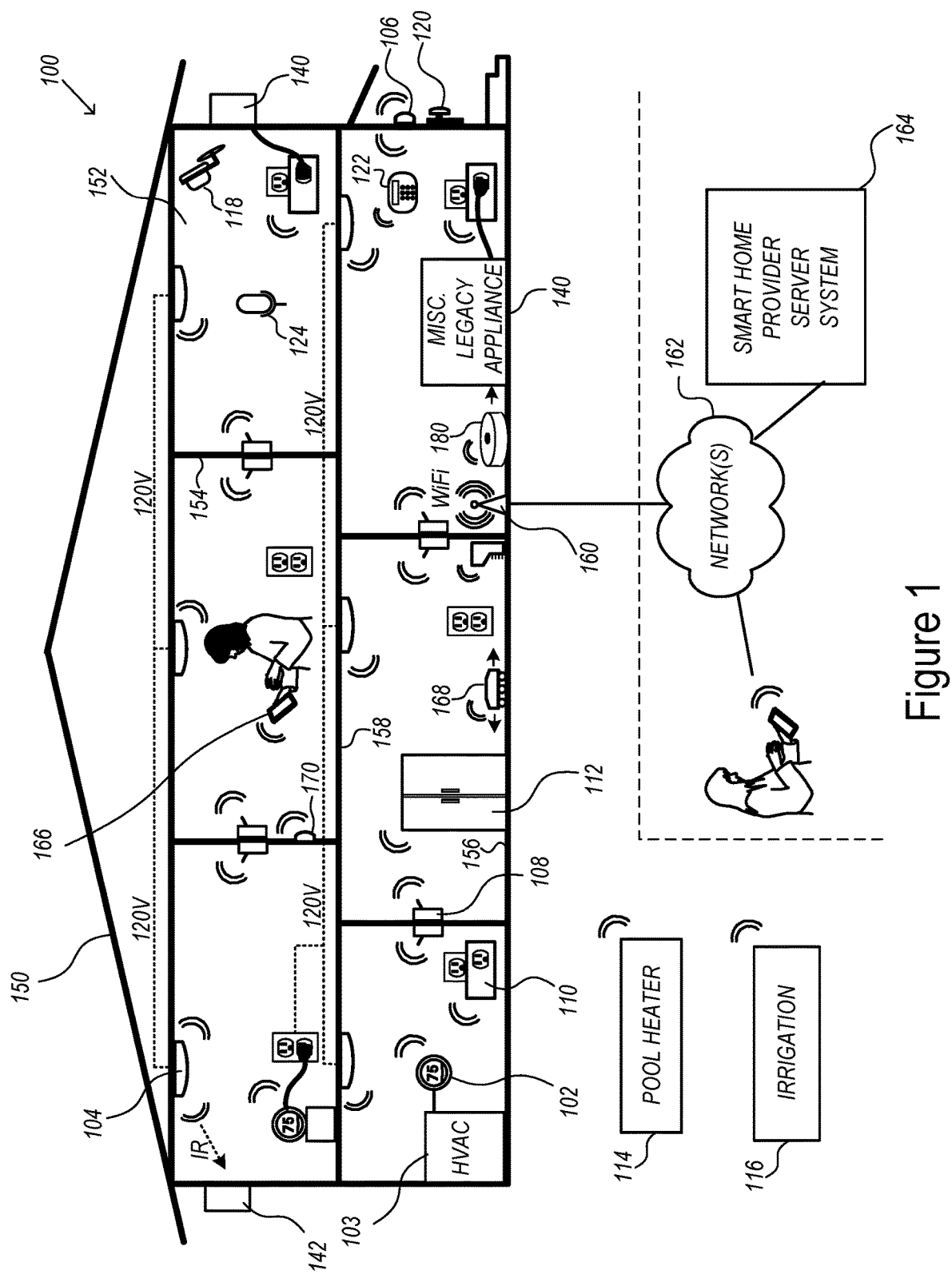
FIG. 1 is an example smart home environment in accordance with some implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

Alternatively, in some implementations, the smart home environment 100 includes one or more network-connected microphone device 124 that are configured to capture audio and provide security functions in the smart home environment 100. Optionally, the microphone device 124 is a stand-alone device that is not included in any other smart device, and can be regarded as a type of smart home device in this application. Optionally, the microphone device 124 is part of another client device 502 or another smart electronic device other than the cameras 118. The microphone device 124 may be used to determine occupancy of the structure 150 and/or particular rooms 152 in the structure 150, and thus may act as occupancy sensors. Specifically, audio captured by the microphone device 124 may be processed to identify the presence of an occupant in the structure 150 (e.g., in a particular room 152). Specific individuals may be identified based, for example, on characteristic of their voices.

In some implementations, audio captured by the microphones in the cameras 118 or the microphone device 124 may also be processed to identify audio features (e.g., a baby sound), and relevant signature events (e.g., a baby cry event) when the audio features meet predetermined criteria.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, 122 and/or 124 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2A:
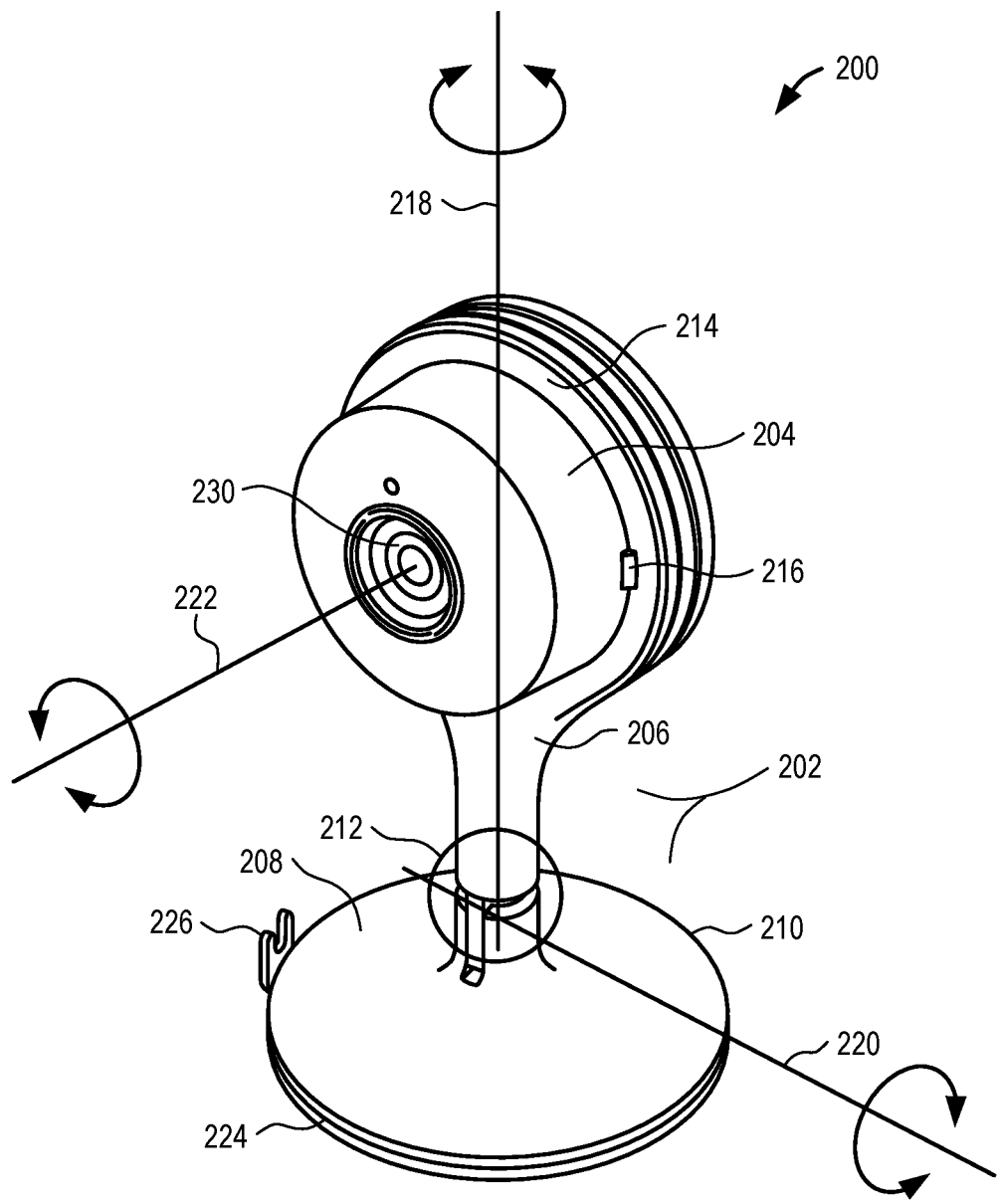
FIG. 2A is a perspective view of a camera assembly that includes a stand assembly and a camera module in accordance with some implementations.
Figure 2B:
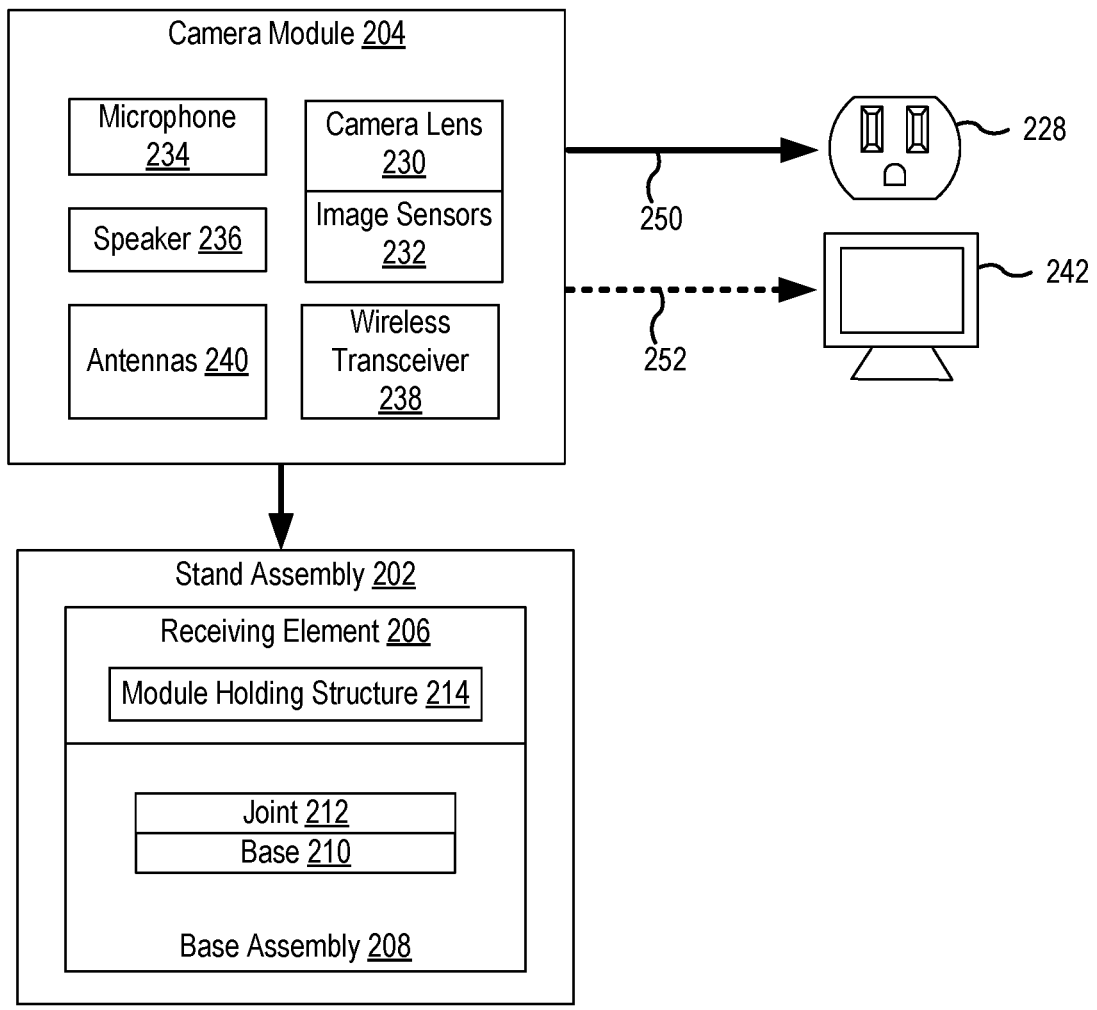
FIG. 2B is a block diagram of a camera assembly shown in FIG. 2A in accordance with some implementations.

FIG. 2A is a perspective view of a camera assembly 200 that includes a stand assembly 202 and a camera module 204 in accordance with some implementations, and FIG. 2B is a block diagram of a camera assembly 200 shown in FIG. 2A in accordance with some implementations. Referring to FIG. 2B, the stand assembly 202 includes a receiving element 206 for receiving the camera module 204, and a base assembly 208 for supporting the receiving element 206. The base assembly 208 includes a base 210 shaped to rest against a supporting surface, and a joint 212 coupled at the base 210.

The receiving element 206 further includes a module holding structure 214 that is configured to hold the camera module 204 (FIG. 2A). Specifically, in some implementations, the module holding structure 214 includes a cutout opening that has a shape conforming to a contour of the camera module 204, and is configured to hold the camera module 204 when the module is inserted within the cutout opening 204. Alternatively, in some implementations, the cutout opening has a non-conforming shape that is distinct from that associated with the contour of the camera module 204, and the camera module 204 is configured to fit within the non-conforming shape of the cutout opening when the module is inserted within the cutout opening 204. For example, the camera module 204 has a circular contour, and the cutout opening of the module holding structure 214 is associated with a polygon (e.g., a square, a pentagon, a hexagon, etc.) into which the circular contour can fit. In some implementations, the camera module 204 is held onto the receiving element 206 by one or more module fasteners 216 (e.g., a snap). When the module fasteners 216 are depressed, the camera module 204 is removed from the cutout opening of the receiving element 206.

Referring to FIG. 2A, the receiving element 206 and the camera module 204 held thereon have at least two degrees of freedom of motion with respect to the base assembly 208. In accordance with a first degree of freedom of motion, the receiving element 206 and the camera module 204 can be rotated or twisted around a twisting axis 218 that passes through the receiving element 204 and is perpendicular to a planar surface of the base 210 (e.g., a bottom surface of the base 210). In accordance with a second degree of freedom of motion, the receiving element 206 and the camera module 204 can be flipped around a flipping axis 220 that passes through a joint 212 and is laid substantially in parallel to the planar surface of the base 210. In some implementations, when the camera module 204 is held onto the receiving element 206 by the module fasteners 216, it is configured to rotate within the cutout opening around a self rotation axis 222 that passes through a center of the camera module 204.

Optionally, the camera assembly 200 is placed on a desktop surface and sits on the bottom surface of the base 210 of the stand assembly 202. Optionally, the camera assembly 200 further includes a mount structure 224 for mounting the camera assembly 200 onto an alternative mounting surface. An example of the mount structure 224 is a wall mount that is configured to be fixed on a wall surface. When the base assembly 208 of the stand assembly 202 is attached to the mount structure 224, the camera is anchored at the location where the mount structure is fixed. In some implementations, the base assembly 208 and the mount structure 224 are attached to each other by a magnetic attraction force. The base assembly 208 can be rotated freely about its central axis with respect to the mounting structure 224 and can be fixed in place at any angle of rotation with respect to the mounting structure 224 (e.g., by using magnetic attraction as described herein, an adhesive, or mechanical attachment).

Further, in some implementations, the mount structure 224 includes a cable guide structure 226 that is arranged on the edge of the mount structure 224. The cable guide structure 226 is configured to guide a cable 250 or 252 that electrically couples the camera module 204 received in the receiving element 206 to an external power supply 228 or another electronic device 242 (e.g., a computational machine). The camera module 204 is configured to receive power and data from the external power supply 228 and the electronic device 242 using the cables 250 and 252. Alternatively, in some implementations, power is provided by a cable 250, while data is provided wirelessly.

In accordance with various implementations of the application, the camera module 204 includes one or more of a camera lens 230, image sensors 232, a microphone 234, a speaker 236, wireless transceiver circuit 238 and one or more antennas 240. In some implementations, the camera module 204 includes an HD (e.g., 720p, 1080p, or higher) camera made of the camera lens 230 and one or more high definition image sensors 232. In some implementations, the camera module 204 includes a microphone and a speaker, such that a person reviewing a live video feed from the camera module 204 can talk in-real to someone being filmed by the camera module 204. In some implementations, the camera module 204 includes a connection port (e.g., female adapter) to which a connection plug (e.g., male adapter) is able to be coupled to supply power or transfer data. For example, the connection port includes a Universal Serial Bus (USB) port, and is used as an input/output interface via which information about a Wi-Fi network is supplied to the camera module 204 (e.g., the name and password of the Wi-Fi network, an encryption key, etc.). Other examples of the connection port include, but are not limited to, an Ethernet port, a High-Definition Multimedia Interface (HDMI) port, and a Power-over-Ethernet (PoE) port. More details on the geometries, the components and the functions of the camera module 204 are explained below with reference to FIGS. 3A-3D.

In some implementations, the camera module 204 includes a Wi-Fi antenna and a Wi-Fi transceiver for communicating data (e.g., multimedia data captured by the camera module 204) over a wireless local area network. In some implementations, the camera module 204 includes a Bluetooth antenna and a Bluetooth transceiver coupled to the Bluetooth antenna. The Bluetooth antenna is used to enable communication with a client device (e.g., a mobile phone) for the purposes of provisioning the camera module 204. In some implementations, the camera module 204 includes a radio antenna and a radio transceiver coupled to the radio antenna. The radio antenna transmits and receives signals according to the IEEE 802.15.4 specifications, and is configured to facilitate communication between the camera module 204 and other smart home devices (e.g., the hub device 180 and the thermostats 102).

In some implementations, the camera module 204 is associated with a software application and a related user interface displayed on a client device. The user interface is optionally an Internet browser application (e.g., Microsoft's Internet Explorer or Mozilla Firefox) running on a computer or a dedicated and/or downloaded application running on a smart phone. A user is able to view video captured by the camera module 204 remotely and/or via a network from the Internet browser application or the dedicated and/or downloaded mobile application.

It is noted that a stand assembly 202 can be configured to support other electronic devices in the smart home environment 100, such as thermostats 102, hazard detectors 104, doorbells 106, wall switches 108, wall plugs 110, pool heater monitor 114, irrigation monitor 116, alarm systems 122, microphone devices 124, and other occupancy sensors (e.g., IR sensors, ambient light sensors, motion detectors, etc.). Specifically, the module holding structure 214 of the stand assembly 202 is configured to match the dimension and geometry of the electronic device supported by the stand assembly 202.

FIGS. 3A-3D illustrate a perspective view, a front view, a rear view and a bottom view of a camera module 204 in accordance with some implementations, respectively. In some implementations, the camera module 204 has a circular contour, and the cutout opening of the receiving element 206 therefore has a circular shape conforming to the contour of the camera module 204 for the purposes of holding the camera module 204.

In some implementations, the camera module 204 includes a status light 302 that is disposed in the proximity of the camera lens for the purposes of indicating whether the camera module 204 is powered on and/or filming. In some situations, when the status light 302 is in the red color, it indicates that the camera module 204 is powered on but not recording video data, and when the status light 302 is in the green color, it indicates that the camera module 204 is recording video data in real-time. When the status light 302 is powered off, it indicates that the camera module 204 is powered off. It is noted that in some implementations, the power and operation statuses of the camera module 204 are indicated by two or more status lights 302 rather than by the color of a single status light 302.

In some implementations, the camera module 204 further includes an ambient light detector 308 that senses availability or intensity of ambient light. The resulting information is used to control parameters of the camera lens, enhance image processing of a captured image, or enable alternative illumination modes (e.g., an infrared light illumination mode).

In some implementations, the back of the camera module 204 is carved with a plurality of grooves 304. The grooves increase friction with the camera module 204 and protect it from slipping to the ground, when the camera module 204 is assembled or disassembled onto the stand assembly 202. Further, in some implementations, the microphone 234 or the speaker 236 is embedded under the carved grooves on the back of the camera module 204. In some implementations, the back of the camera module 204 further includes a reset pin 320. When a user of the camera module 204 presses the reset pin 320, the camera module 204 is reset to its original status that it has when it is shipped out of factory.

Figures 3A, 3B:
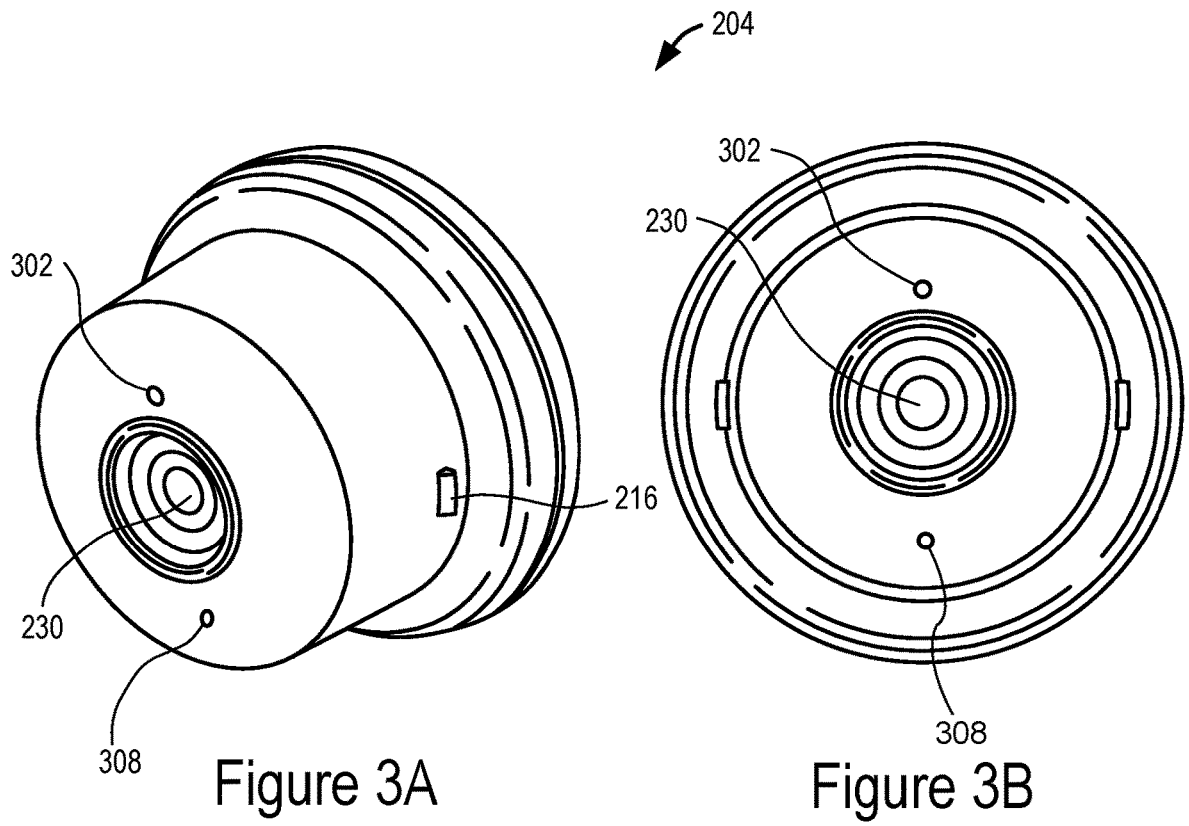
FIGS. 3A-3D illustrate a perspective view, a front view, a rear view and a side view of a camera module in accordance with some implementations, respectively.
Figures 3C, 3D:
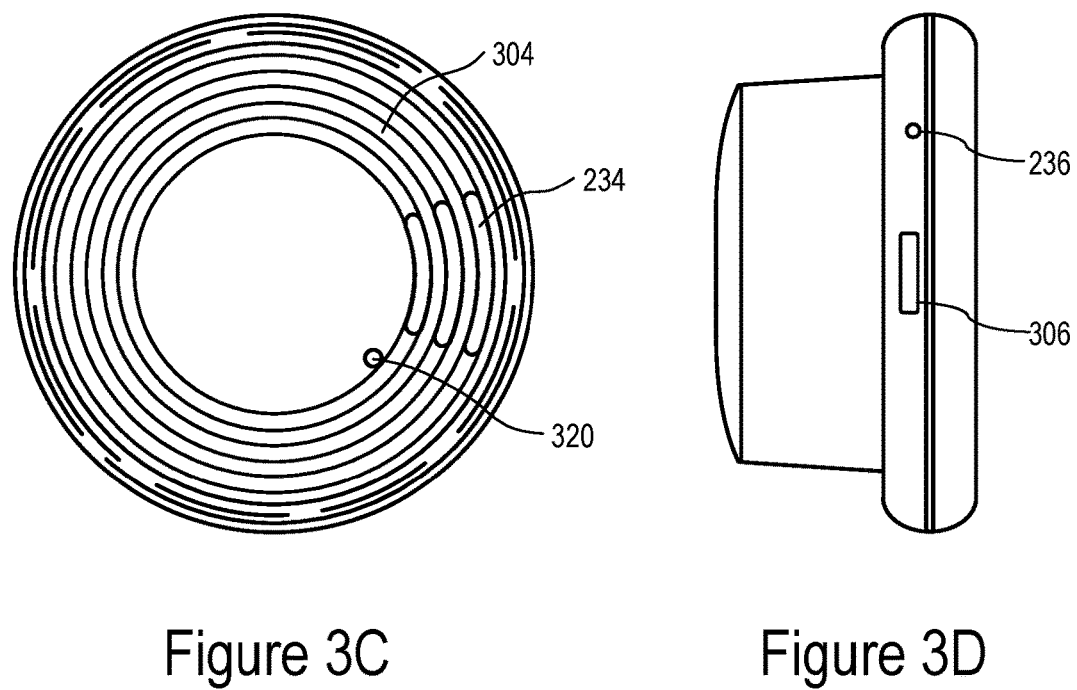

Referring to FIG. 3D, in some implementations, the bottom of the camera module 204 further includes a connection port 306 to which a connection plug is able to be coupled to supply power or transfer data. For example, the connection port 306 includes one or more of a USB port, an Ethernet port, a HDMI port, and a PoE port. The connection port 306 is used as an input/output interface via which information about the Wi-Fi network is supplied to the camera module 204 (e.g., the name and password of the Wi-Fi network, an encryption key, etc.). In another example, the connection port 246 connects to a power cable that electrically couples the camera module 204 to an external power supply. In some implementation, the speaker 236 is disposed on the bottom of the camera module 204.

It is noted that in the above implementations, the microphone 234, the speaker 236, the reset pin 320 and the connection port 306 are arranged on the back or the bottom of the camera module 204 to render a compact form factor. The locations of these components are not limited by the above arrangements, and can be arranged elsewhere, e.g., on the front or the periphery of the camera module 204.

As shown in FIG. 3D, the camera module 204 has a relatively low profile. When it is flipped down around the flipping axis 220 that passes through the joint 212 of the base assembly 208, the back of the camera module 204 can almost reach a desktop surface or a mounting surface against which the base assembly 208 rests. Under these circumstances, the low profile of the camera module 204 results in a large adjustable angle for the camera module 204, and allows the camera module 204 to be packaged in a shipping box in a compact manner.

Figure 4A:
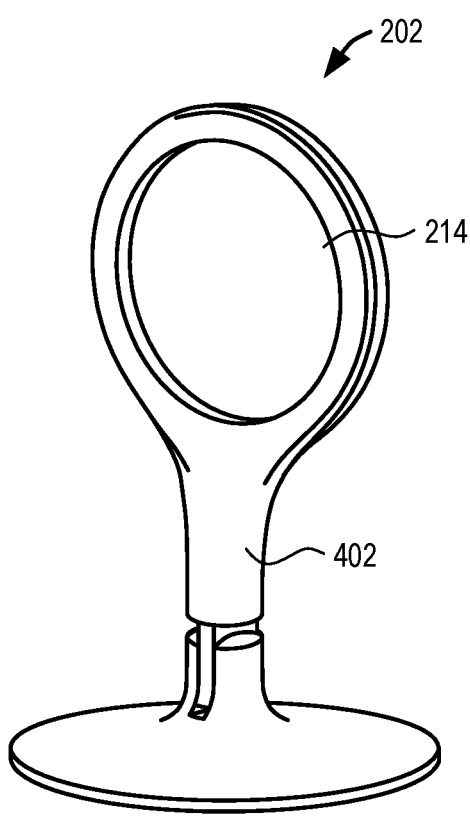
FIG. 4A is a perspective view of a stand assembly for supporting a module (e.g., a camera module) in accordance with some implementations.
Figure 4B:
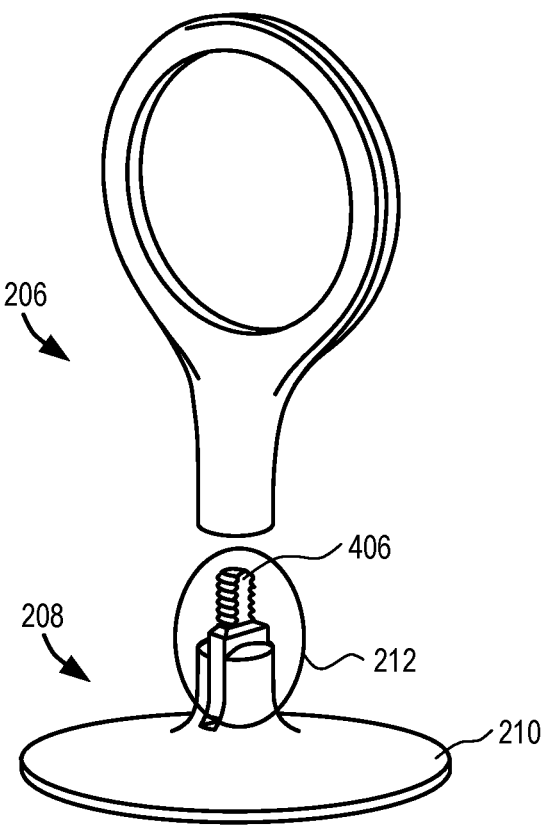
FIG. 4B illustrates a stand assembly that is decoupled to a receiving element and a base assembly in accordance with some implementations.
Figure 4C:
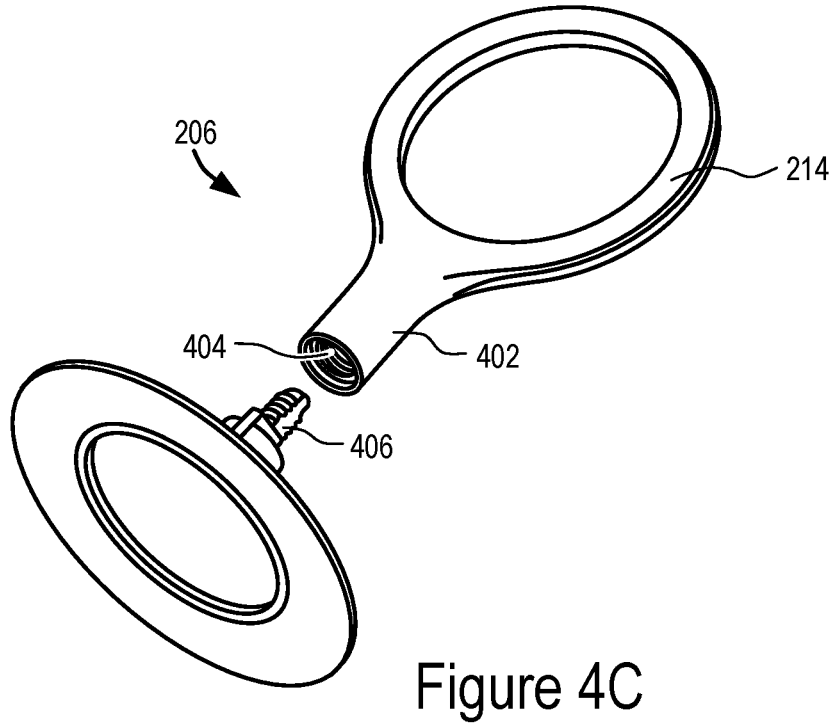
FIG. 4C illustrates a stand assembly that includes fastener structures for mechanically coupling a receiving element to a base assembly in accordance with some implementations.

FIG. 4A is a perspective view of a stand assembly 202 for supporting a module (e.g., a camera module 204) in accordance with some implementations, and FIG. 4B illustrates a stand assembly 202 that is decoupled to a receiving element 206 and a base assembly 208 in accordance with some implementations. Further, FIG. 4C illustrates a stand assembly 202 that includes fastener structures 404 and 406 for mechanically coupling a receiving element 206 to a base assembly 208 in accordance with some implementations.

As explained above, the stand assembly 202 includes the receiving element 206 and the base assembly 208. The receiving element 206 includes a module holding structure 214 and an extended portion 402 that extends from the module holding structure 214. In some implementations, the module holding structure 214 is substantially flat. Here, the camera module 204 is removed from the module holding structure 214 of the receiving element 206. The receiving element 206 further includes a first fastener structure 404 coupled to an end of the extended portion 402 located opposite another end of the extended portion 402 that extends from the module holding structure 214. In some implementations, the first fastener structure 404 is entirely hidden inside the extended portion 402 when the receiving element 206 is assembled onto the base assembly 208.

In addition to the base 210, the base assembly 208 further includes a second fastener structure 406. As shown in FIG. 4B, in some implementations, the second fastener structure 406 is coupled to the base 210 of the base assembly 208 at a joint 212. The second fastener structure 406 is configured to mate with the first fastener structure 404. In a specific example, the first fastener structure 404 includes a screw hole, and the second fastener structure 406 includes a screw structure that matches the screw hole of the first fastener structure 404. When the first fastener structure 404 is entirely hidden inside the extended portion 402, both the fastener structures 404 and 406 are structurally invisible to a user when the receiving element 206 is assembled onto the base assembly 208. As such, in some implementations, the first fastener structure 404 associated with the first degree of freedom of motion is structurally invisible to a user of the stand assembly 202, and the joint 212 associated with the second degree of freedom of motion is structurally visible to the user of the stand assembly 202.

Figure 5:
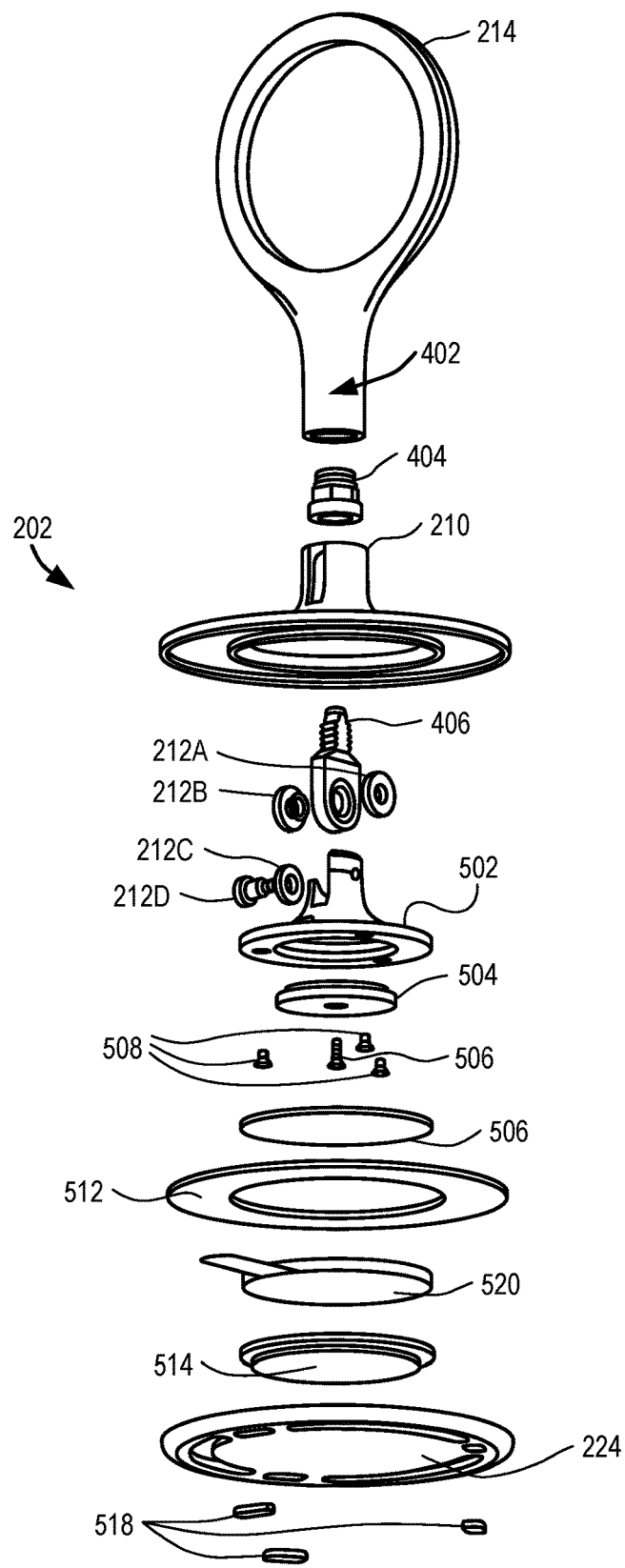
FIG. 5 is an exploded view of a stand assembly for supporting a sensor module in accordance with some implementations.

FIG. 5 is an exploded view of a stand assembly 202 for supporting a sensor module in accordance with some implementations. As explained above, the stand assembly 202 includes the receiving element 206 and the base assembly 208. The receiving element 206 includes:
 a module holding structure 214 and an extended portion 402 that are made of a piece of material; and
 a first fastener structure 404.
The base assembly 208 further includes one or more of the following components:
 a base 210;
 a second fastener structure 406;
 one or more joint fasteners 212A-212D for creating a joint 212 at the base 210;
 a hinge carrier 502 where the joint 212 and a magnet plate 504 are mounted;
 the magnet plate 504 that is integrated in the base assembly 208;
 one or more magnet fasteners 506 that fasten the magnet plate 504 to the hinge carrier 502 or the base 210;
 one or more base fasteners 508 that fasten the hinge carrier 502 to the base 210;
 a cover plate 510 that is attached to a bottom surface of the base 210 for sealing the hinge carrier 502 and the magnet plate 504 inside the base assembly 208; and
 one or more rubber patches 512 that are attached to the bottom surface of the base 210 for increasing friction on the bottom surface.

In various implementations of the applications, the first fastener structure 404 and the joint 212 are configured to provide a first degree of freedom of motion and a second degree of freedom of motion of the receiving element 206 with respect to the base 210, respectively. More details on the methods of assembling the first fastener structure 404 and the joint 212 are explained below with reference to FIGS. 7A-7F, 8A-8C, 9A, and 9B.

In some implementations, the stand assembly 202 further includes a mount structure 224 that is configured be attached and fixed onto a mounting surface using mount fasteners (e.g., screws). At least part of the mount structure 224 is made of magnetically attractable material, such that the stand assembly 202 can be mounted onto a mounting surface when the base 210 of the base assembly 208 magnetically adheres onto the mount structure 224. Specifically, in some implementations, the mount structure 224 includes:

a magnetically attractable plate 514 that is configured to adhere to the magnet plate 504 when they are placed in the proximity to or in contact with each other;

a mount structure 224 that receives the magnetically attractable plate 514 and is configured for being fixed on a mounting surface; and one or more mount fasteners 518 that are applied to fasten the mount structure 224 to a mounting surface.

In some implementations, the stand assembly 202 further includes a detachable foam plate 520. When the detachable foam plate 520 is disposed between the bottom surface of the base 210 and the mount structure 224, the detachable foam plate 520 increases a distance between the magnet plate 504 of the base assembly 208 and the magnetically attractable plate 514 of the mount structure 224, and therefore reduces a magnetic attraction force between the base assembly 208 and the mount structure 224. In some implementations, the magnetic attraction force is relatively large, and it requires a large force to detach the base assembly 208 from the mount structure 224 once they adhere to each other. This detachable foam plate 520 protects the base assembly 208 from magnetically adhering to the mount structure 224 before the mount structure 224 is fixed on a mounting surface, thereby easing the difficulty of handling the stand assembly 202 for a user of the stand assembly 202.

Figure 6A:
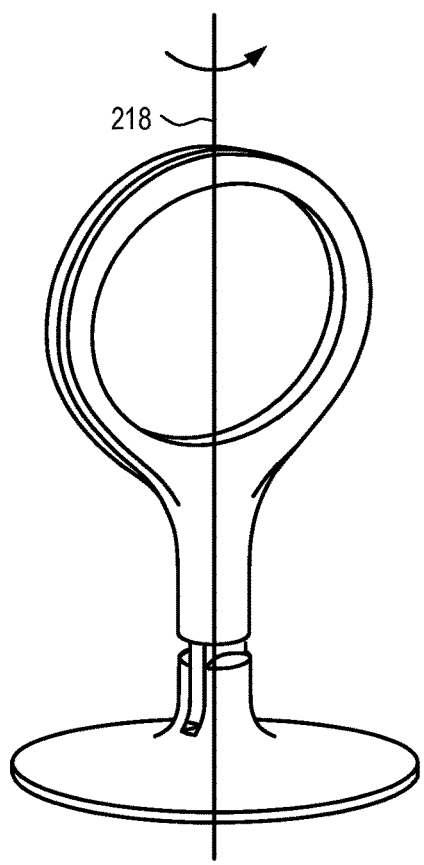
FIGS. 6A-6F illustrate three positions of a receiving element when the receiving element is twisted with respect to a base assembly at a first degree of freedom of motion in accordance with some implementation.
Figure 6B:
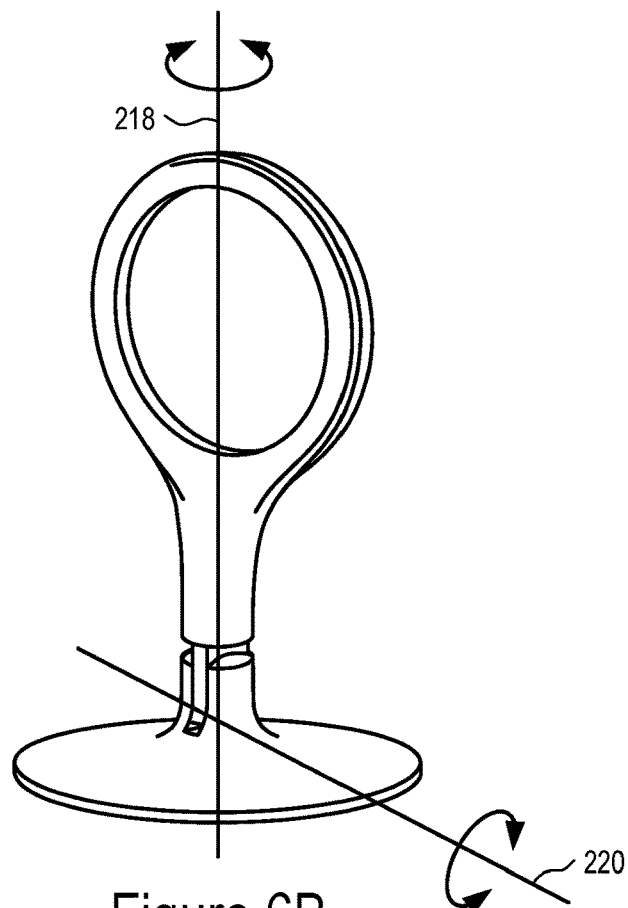
Figure 6C:
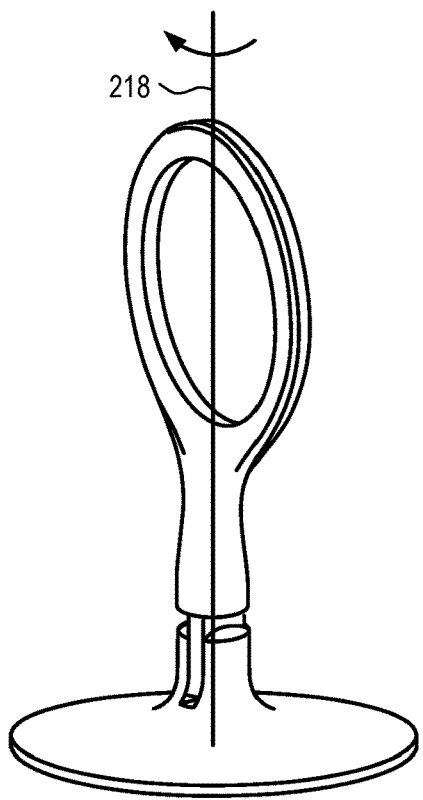

FIGS. 6A-6C illustrate three example positions of a receiving element 206 when the receiving element 206 is rotated/twisted with respect to a base assembly 208 at a first degree of freedom of motion in accordance with some implementation. The base 210 includes a planar surface (e.g., a bottom surface) for resting against a supporting surface, and the first degree of freedom of motion is associated with twisting of the receiving element 206 with respect to a twisting axis 218 that passes through the receiving element and is perpendicular to the planar surface of the base 210. The movement of the receiving element 206 at the first degree of freedom has substantially consistent resistance through first part of a first full range of motion associated with the first degree of freedom of motion. In a specific example, the first part of the first full range of motion is associated with a twisting angle that is substantially equal to 90 degrees. Stated another way, the receiving element 206 has a nominal position (FIG. 6B), and is configured to be twisted up to 45 degrees in either the clockwise or counterclockwise direction to reach two end positions (FIGS. 6A and 6C).

Figure 6D:
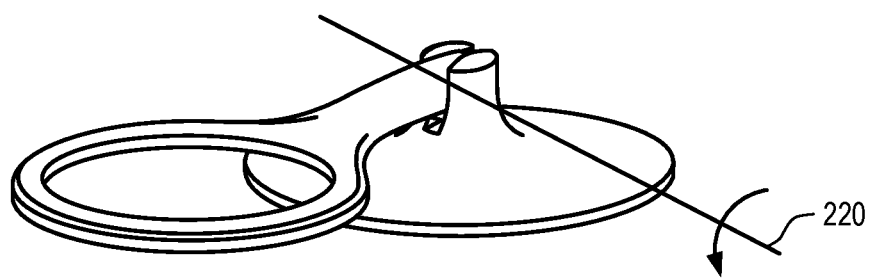
Figure 6E:
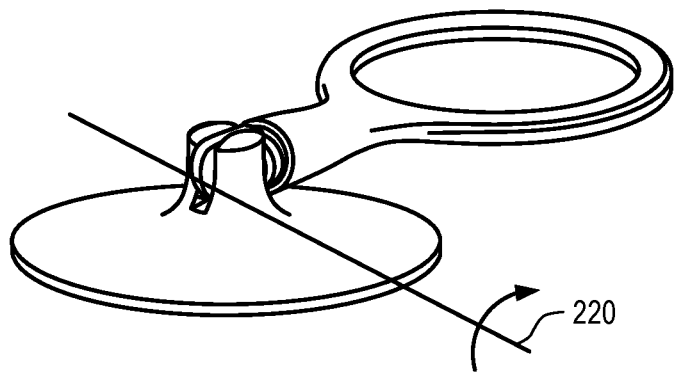

FIGS. 6D and 6E illustrate two example end positions of a receiving element 206 when the receiving element 206 is rotated/flipped with respect to a base assembly 208 at a second degree of freedom of motion in accordance with some implementation. The base 210 includes a planar surface (e.g., a bottom surface) for resting against a supporting surface, and the second degree of freedom of motion that is enabled by a joint 212 is associated with rotating/flipping of the receiving element 206 with respect to a flipping axis 220 that passes through the joint 212 and is substantially parallel to the planar surface of the base 210. The movement of the receiving element 206 at the second degree of freedom has substantially consistent resistance through a second full range of motion associated with the second degree of freedom. In a specific example, the receiving element 206 is configured to flip with respect to the flipping axis 220 by an angle that is substantially equal to 180 degrees. Stated another way, the receiving element 206 starts at a nominal position (FIG. 6B), and is configured to be flipped up to 90 degrees in either the forward or backward direction to reach two end positions (FIGS. 6D and 6E).

In some implementations, the nominal position is reached when the module holding structure 214 of the receiving element 206 is arranged to align in parallel or overlap with both the twisting axis 218 and the flipping axis 220. When the receiving element 206 is flipped at the second degree of freedom of motion to an end position (FIG. 6D or 6E), the receiving element 206 and the camera module 204 mounted there on are laid in a substantially flat position, i.e., substantially in parallel with the planar surface of the base 210. The back of the camera module 204 can almost reach a desktop surface or a mounting surface against which the base assembly 208 rests. Under these circumstances, if the camera module 204 has a low profile, it would obtain a large adjustable angle at the fully flipped end positions, and can also be packaged in a shipping box in a compact manner (see FIGS. 14A-14F).

Figure 6F:
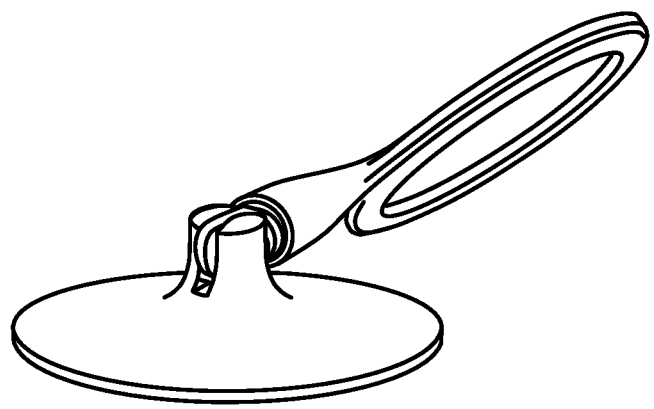

FIG. 6F illustrates a receiving element 206 that is both twisted at the first degree of freedom of motion and rotated at the second degree of freedom of motion in accordance with some implementation. Specifically, in this example, the receiving element 206 is twisted by a first twisting angle in a clockwise direction associated with the first degree of freedom of motion, and flipped by a second flipping angle in a backward direction associated with the second degree of freedom of motion. Optionally, both the first twisting angle and the second flipping angle are measured with reference to the nominal position (FIG. 6B). Likewise, the clockwise, counterclockwise, forward and backward directions are also described with reference to the nominal position.

Figure 7A:
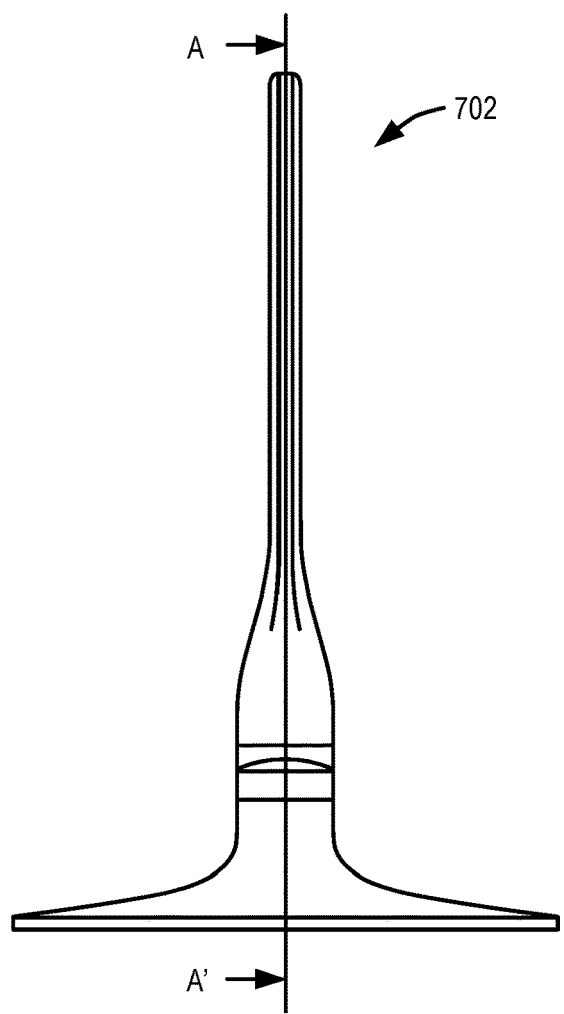
FIG. 7A is a side view of a stand assembly in accordance with some implementations.
Figure 7B:
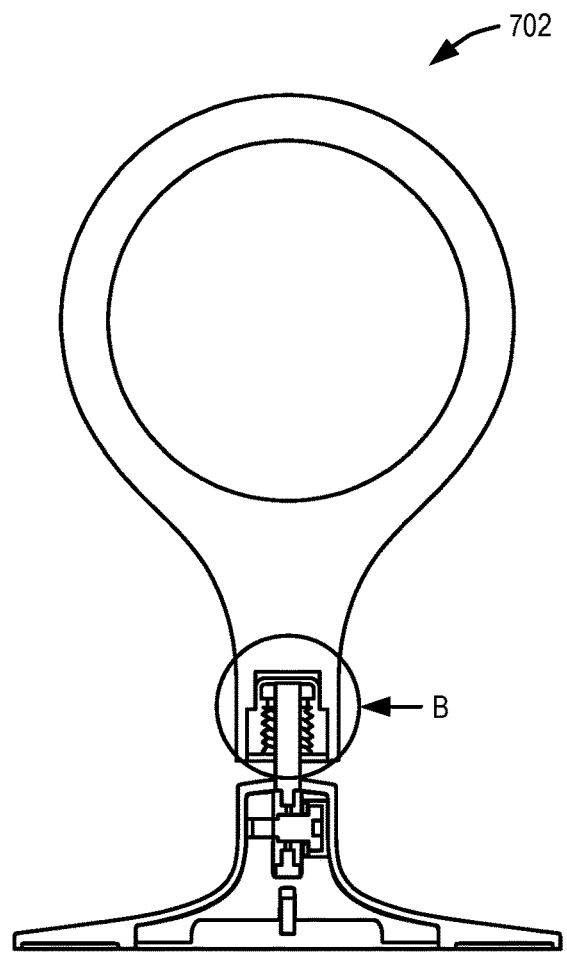
FIG. 7B is a cross sectional view of cross section A-A' of the stand assembly shown in FIG. 7A.
Figure 7C:
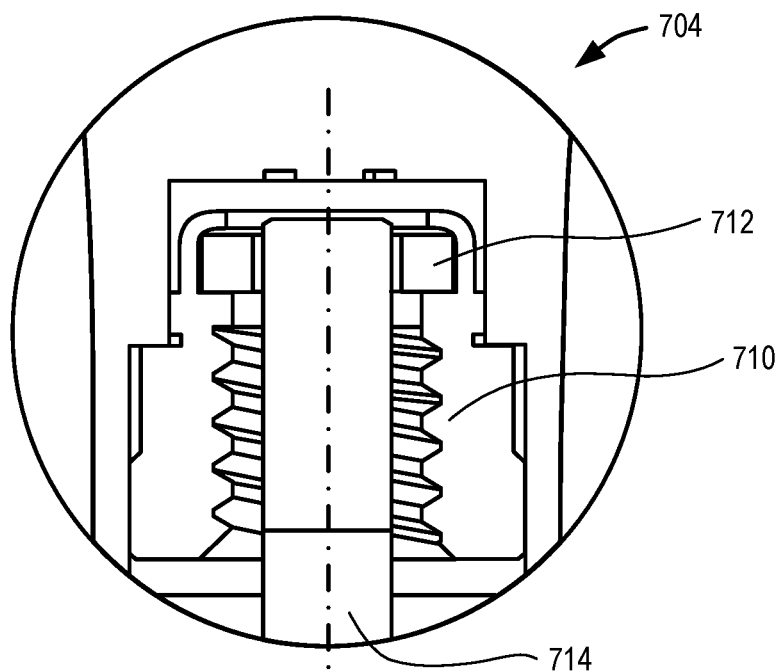
FIG. 7C is an enlarged view of two fastener structures that couple a receiving element to a base assembly in the stand assembly shown in FIGS. 7A and 7B in accordance with some implementations.
Figure 7D:
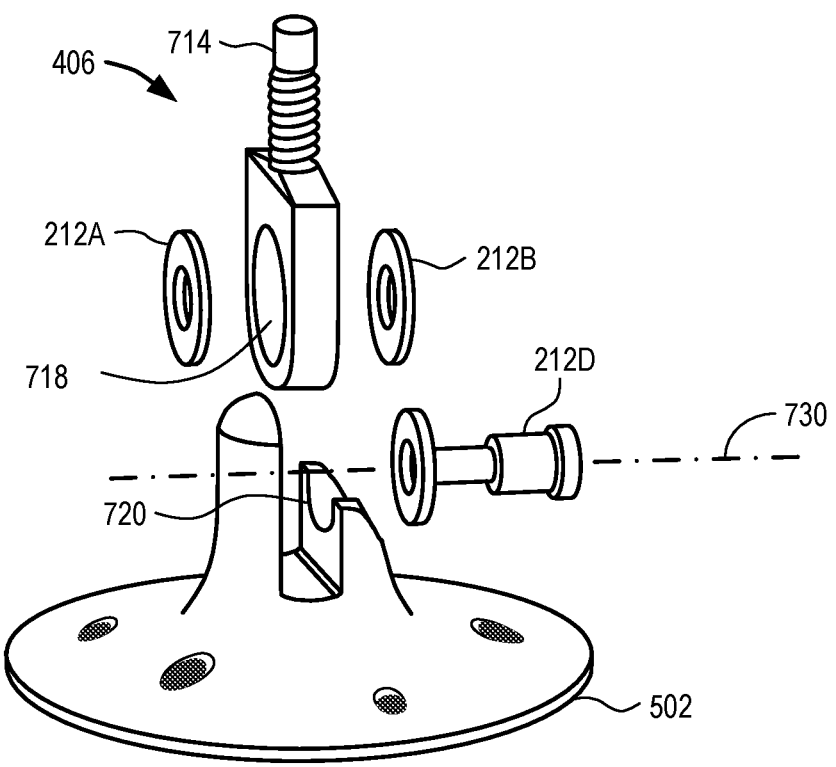
FIGS. 7D, 7E and 7F illustrate an exploded view, a cross-sectional view (cross section A-A'), and a side view of a joint of a stand assembly shown in FIG. 7B in accordance with some implementations, respectively.
Figure 7E:
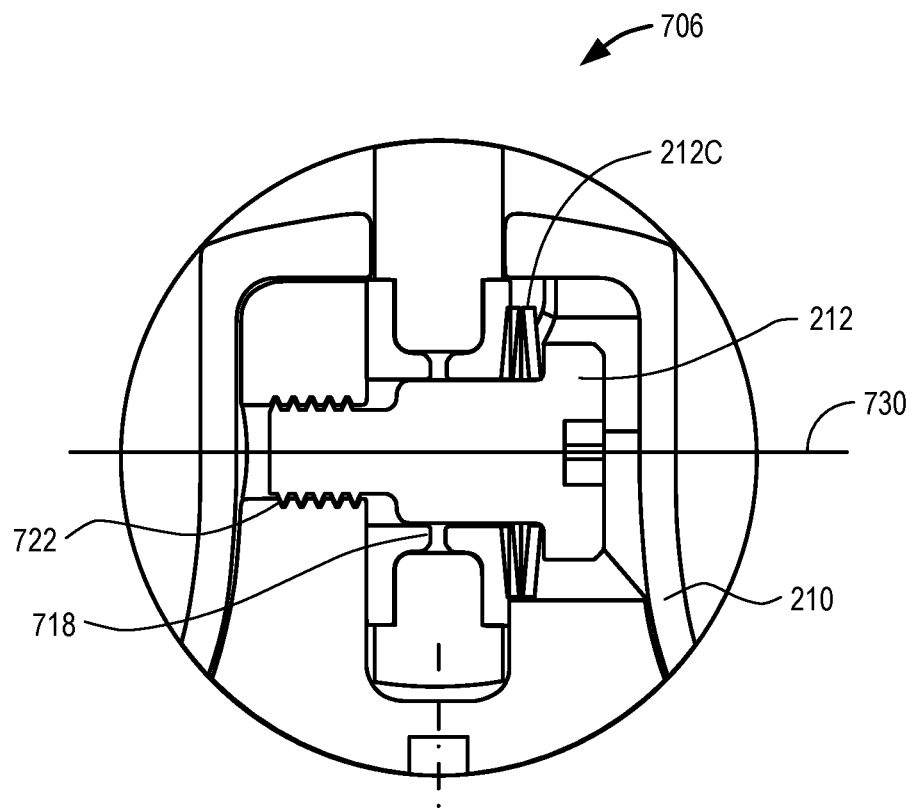
Figure 7F:
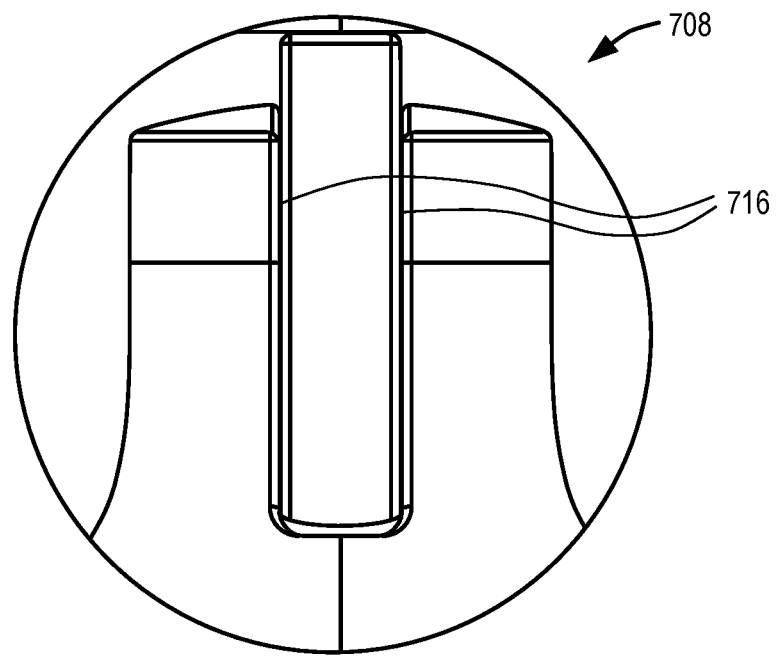

FIG. 7A is a side view of a stand assembly 202 in accordance with some implementations, and FIG. 7B is a cross sectional view 702 of a cross section A-A' of the stand assembly 202 shown in FIG. 7A. FIG. 7C is an enlarged view 704 of a region B shown in FIG. 7B in accordance with some implementations. The region B includes two fastener structures that couple a receiving element 206 to a base assembly 208 in the stand assembly 202. FIGS. 7D, 7E and 7F illustrate an exploded view, a cross-sectional view 706 (cross section A-A'), and a side view 708 of a joint 212 of a stand assembly 202 shown in FIG. 7B in accordance with some implementations, respectively.

As explained above, the receiving element 206 is configured to move with respect to the base 210 at the first degree of freedom of motion when the first fastener structure 404 is fastened onto the second fastener structure 406 of the base assembly 208. In accordance with the enlarged view of the two fastener structures (FIG. 7C), the first fastener structure 404 of the receiving element 206 further includes a screw hole 710 and a nylon-like bushing 712 coupled at the end of the screw hole 710. The screw hole 710 matches a screw structure 714 of the second fastener structure 406. The screw hole 710 has a predetermined thread length, and provides a second part of the first full range of motion when the first fastener structure 404 is fastened onto the second fastener structure 406 via the screw hole 710 and the screw structure 714. The nylon-like bushing 712 has a predetermined bushing depth, and provides the first part of the first full range of motion when the first fastener structure 404 is fastened onto the second fastener structure 406 via the screw hole 710 and the screw structure 714. The second part of the first full range of motion is distinct from the first part of the first full range of motion. As such, the second fastener structure 406 sequentially passes the second part and the first part of the first full range of motion associated with the first degree of freedom of motion, when it is fastened into the first fastener structure 404 of the receiving element 206.

In some implementations, the nylon-like bushing has a first coefficient of friction that is associated with the substantially consistent resistance through the first part of the first full range of motion, and the screw hole has a second coefficient of friction that is associated with alternative resistance through the second part of the first full range of motion. The alternative resistance through the second part of the first full range of motion is distinct from the substantially consistent resistance through the first part of the first full range of motion.

When the second fastener structure 406 is fully tightened into the screw hole 710 and the nylon-like bushing 712 of the first fastener structure 404, the first fastener structure 404 is coupled to the second fastener structure 406 at its tightened position. The tightened position of the first fastener structure 404 is associated with an end position (FIG. 6A or 6C) that the receiving element 206 has within the first part of the first full range of motion associated with the first degree of freedom of motion.

As shown in FIG. 7D, in some implementations, the second fastener structure 406 of the base assembly 208 is flattened to have two substantially flat surfaces, such that it can fit into a base opening slot 716 on the base assembly 208. The second fastener structure 406 includes a screw structure 714 on its top half and a joint hole 718 on its bottom half. While the top half of the second fastener structure 406 is fastened to the first fastener structure 404, the bottom half of the second fastener structure 406 fits into the base opening slot 716 to form the joint 212 that rotates with respect to the joint hole 718.

In some implementations, a hinge carrier 720 is used as a platform to create a joint 212. The joint 212 includes a plurality of joint fasteners, e.g., a first bushing 212A, a second bushing 212B, a bevel spring stack 212C and a hinge screw 212D. The joint fasteners 212A-212D together fasten the bottom half of the second fastener structure 406 onto the carrier slot 720 of the hinge carrier 502 to form the joint 212. Specifically, the first and second bushings 212A and 212B are disposed on two sides of the second fastener structure 406, and between the respective side of the second fastener structure 406 and the carrier slot 710 of the hinge carrier 502. The first and second bushings 212A and 212B provide side to side location and smooth bearing surfaces for the joint 212. In addition, the bevel spring stack 212C provides positive tension on the hinge screw 212D, and creates frictional resistance and torque around a hinge axis 730 when the hinge screw 212D is tightened through the joint hole 718 and a screw hole 722 on the hinge carrier 502 to form the joint 212. The hinge axis 730 passes through the center of the joint hole 718 on the second fastener structure 406, and substantially overlaps the flipping axis 220 associated with the second degree of freedom of motion of the receiving element 206 with respect to the base assembly 208.

When the hinge carrier 502 is assembled into the base 210, the screw structure 714 of the second fastener structure 406 extends beyond the base opening slot 716. The second fastener structure 406 is configured to rotate around the hinge axis 730 while being constrained within the base opening slot 716. When the screw structure 714 of the second fastener structure 406 is fastened with the first fastener structure 404, the receiving element 206 is mounted onto the base assembly 208, and therefore can rotate or flip with respect to its flipping axis 220 (i.e., the hinge axis 730) to provide the second degree of freedom of motion for a module mounted onto the module holding structure 214.

Figure 8A:
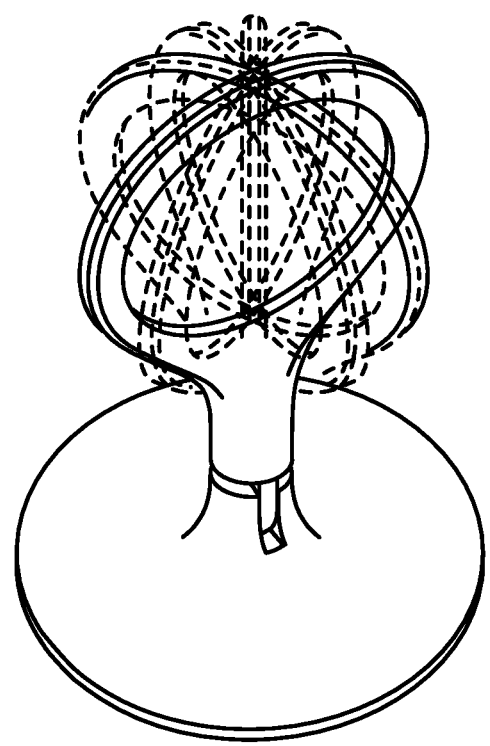
FIG. 8A illustrates another exemplary stand assembly in which movement of a receiving element with respect to a base assembly is unlimited in a direction of travel associated with a first degree of freedom of motion in accordance with some implementations.
Figure 8B:
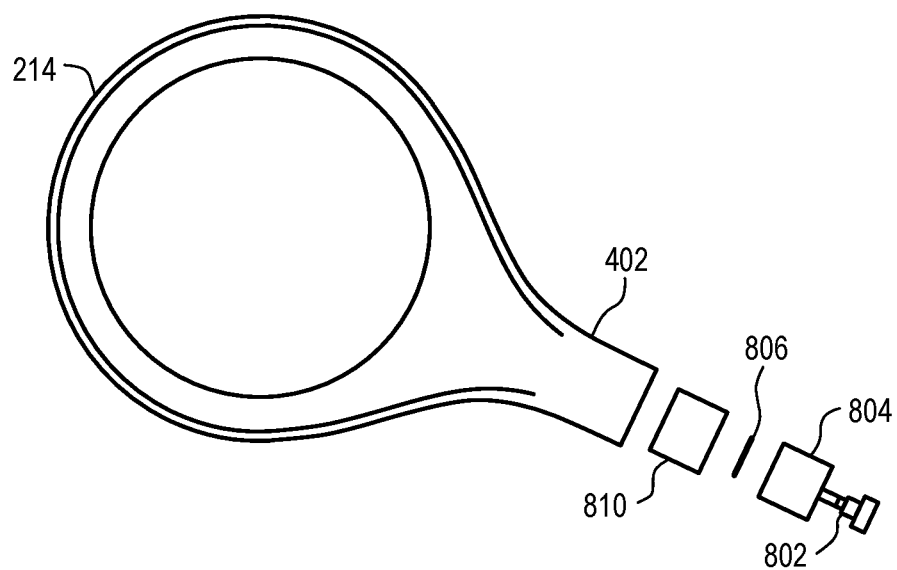
FIG. 8B is an exploded view of a receiving element that has an unlimited movement range in a direction of travel associated with a first degree of freedom of motion as shown in FIG. 8A in accordance with some implementations.
Figure 8C:
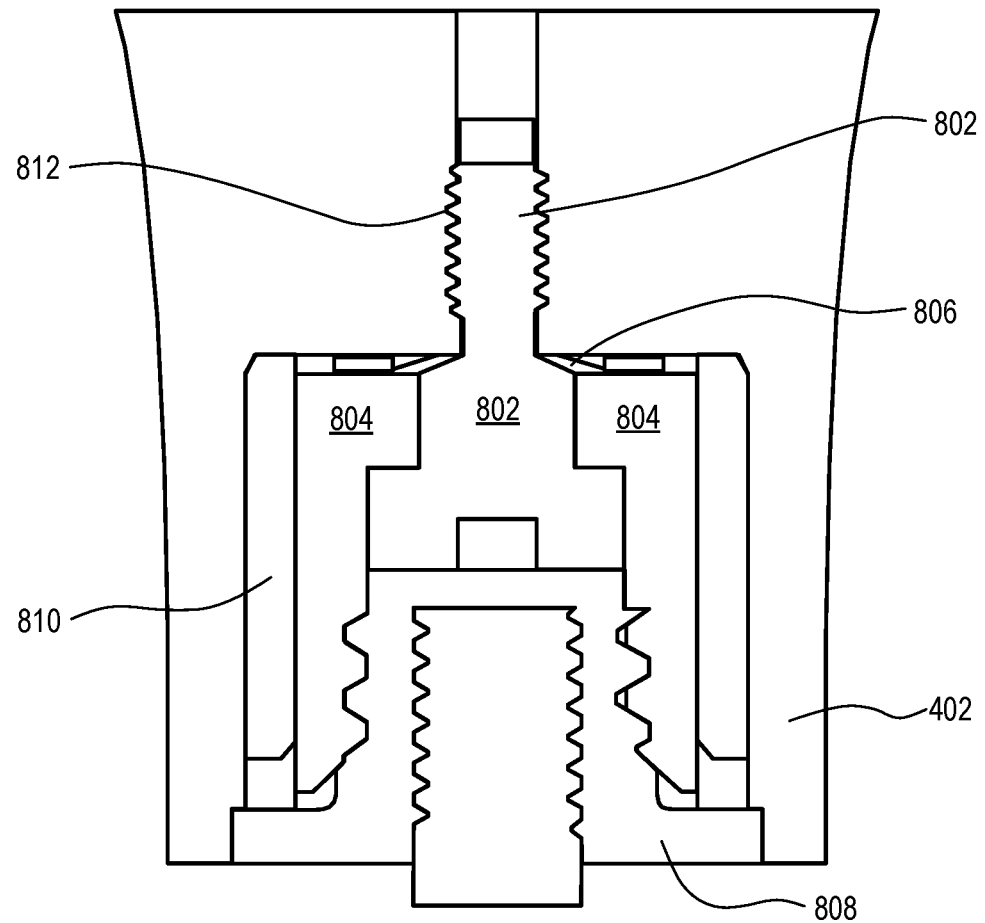
FIG. 8C is a cross sectional view of fastener structures of a stand assembly that enable an unlimited movement range in a direction of travel associated with a first degree of freedom of motion as shown in FIG. 8A in accordance with some implementations.

FIG. 8A illustrates another exemplary stand assembly 202 in which movement of a receiving element 206 with respect to a base assembly 208 is unlimited in a direction of travel associated with a first degree of freedom of motion in accordance with some implementations. FIG. 8B is an exploded view of a receiving element 206 that has an unlimited movement range in a direction of travel associated with a first degree of freedom of motion as shown in FIG. 8A in accordance with some implementations. FIG. 8C is a cross sectional view of fastener structures of a stand assembly 202 that enable an unlimited movement range in a direction of travel associated with a first degree of freedom of motion as shown in FIG. 8A in accordance with some implementations.

The movement of the receiving element 206 at the first degree of freedom is unlimited in a first direction (e.g., a clockwise direction) of travel associated with the first degree of freedom. The first degree of freedom is associated with a reverse direction (e.g., a counterclockwise direction) of travel that is opposite to the first direction of travel associated with the unlimited movement at the first degree of freedom, and the first and second fastener structures 404 and 406 are unfastened when the receiving element 206 moves with respect to the base assembly 208 in the reverse direction of travel associate with the first degree of freedom. As such, in some implementations, a user of the stand assembly 202 is required to adjust the orientation of the module mounted onto the receiving element 206 by twisting the receiving element 206 only in the first direction of travel.

Referring to FIGS. 8B and 8C, in some implementations, the first fastener structure 404 further includes a shoulder screw 802, a sleeve bushing 804, a spring washer 806, and a collar 808. The collar 808 is fastened inside the sleeve bushing 804 to provide a screw hole that matches a screw structure of the second fastener structure 406. The screw hole of the collar 808 is configured to be tightened onto the screw structure of the second fastener structure 406 along the first direction of travel associated with the first degree of freedom. When the receiving element 206 moves further along the first direction of travel, the sleeve bushing 804 and the screw hole of the first fastener structure 404 do not move and therefore are fixed with respect to the second fastener structure 406 of the base assembly 208.

The extended portion 402 of the receiving element 206 includes a thread locker 812 embedded therein, the shoulder screw 802 is configured to lock into place with the thread locker 812 for the purposes of fastening the first fastener structure 404 to the receiving element 206. As such, the first fastener structure 404 is configured to be loosely suspended within the extended portion 402 of the receiving element 206 via the shoulder screw 802. The spring washer 806 is mounted on the top of the sleeve bushing 804. When the first fastener structure 404 is fastened into the extended portion 402, the spring washer 806 can touch the interior wall of the extended portion 402, and compression of the spring washer 806 defines a torque resistance for rotating the receiving element 206 at the first degree of freedom of motion.

The receiving element 206 further includes a low friction bushing 810 that is attached onto the interior wall of the extended portion 402. In accordance with the unlimited motion in the direction of travel associated with the first degree of freedom of motion, the sleeve bushing 804 of the first fastener structure 404 is tightened onto the second fastener structure 406 and rotates against the surface of the low friction bushing 810 inside the extended portion 402.

Stated another way, the low friction bushing 810 wraps around the first fastener structure, and rotates as part of the receiving element 206 with respect to the base assembly 208, and with respect to the first fastener structure 404 when the first fastener structure 404 is tightened onto the second fastener structure 406 of the base assembly 208. The torque resistance associated with the rotation is defined by the spring washer 806 mounted on the top of the sleeve bushing 804. Moreover, the low friction bushing 810 is configured to hug the first fastener structure 404 closely, such that the first fastener structure 404 does not wobble inside the extended portion 402 or cause an unstable support for the module mounted on the stand assembly 202. In some implementations, the low friction bushing 810 is made of elastic rubber material.

In some implementations, the spring washer 806 renders a substantially consistent resistance for the unlimited movement of the receiving element 206 in the first direction of travel associated with the first degree of freedom of motion. Further, in some implementations, the unlimited movement of the receiving element at the first direction of travel is associated with a first torque resistance optionally created by the spring washer 806, and the first torque resistance is substantially greater than a second torque resistance that is required to unfasten the receiving element from the base assembly in the reverse direction of travel.

Figure 9A:
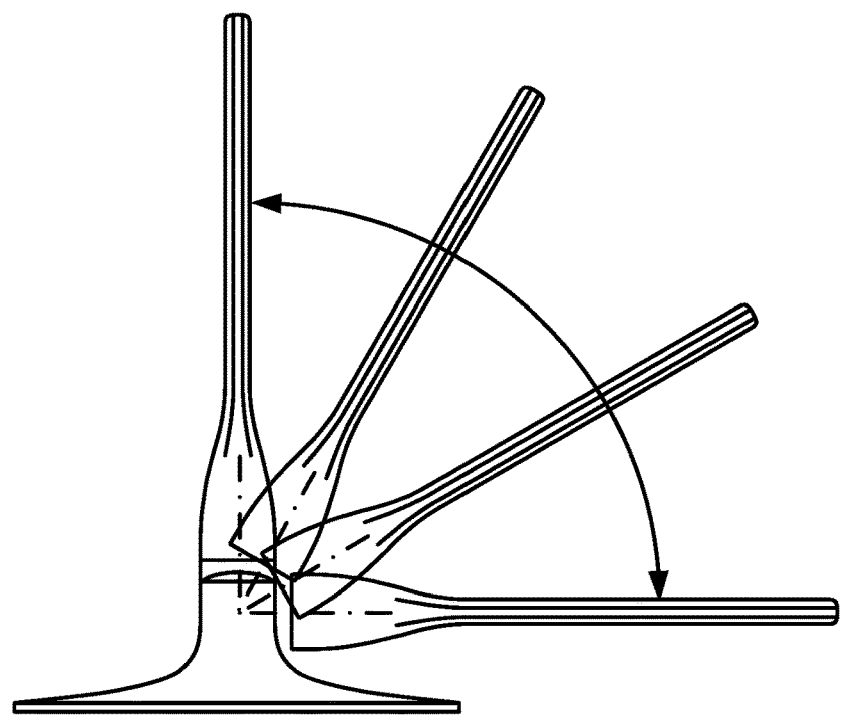
FIG. 9A illustrate another exemplary stand assembly in which movement of a receiving element with respect to a base assembly is limited at a second degree of freedom of motion in accordance with some implementations.

FIG. 9A illustrate another exemplary stand assembly 202 in which movement of a receiving element 206 with respect to a base assembly 208 is limited at a second degree of freedom of motion in accordance with some implementations. The second degree of freedom of motion is associated with flipping of the receiving element 206 at a joint 212 of the base assembly 208 with respect to a flipping axis 220, and the flipping axis 220 passes through the joint 212 and is substantially parallel to a planar surface (e.g., a bottom surface) of the base 210. The movement of the receiving element 206 at the second degree of freedom has substantially consistent resistance through a second full range of motion associated with the second degree of freedom. The second full range of motion is limited. In a specific example, the receiving element 206 is configured to flip with respect to the flipping axis 220 by an angle that is substantially equal to 180 degrees. Stated another way, the receiving element 206 starts at a nominal position (e.g., a vertical position shown in FIG. 6B), and is configured to be flipped up to 90 degrees in either the forward or backward direction to reach its end positions of a second full range of motion associated with the second degree of freedom of motion.

Figure 9B:
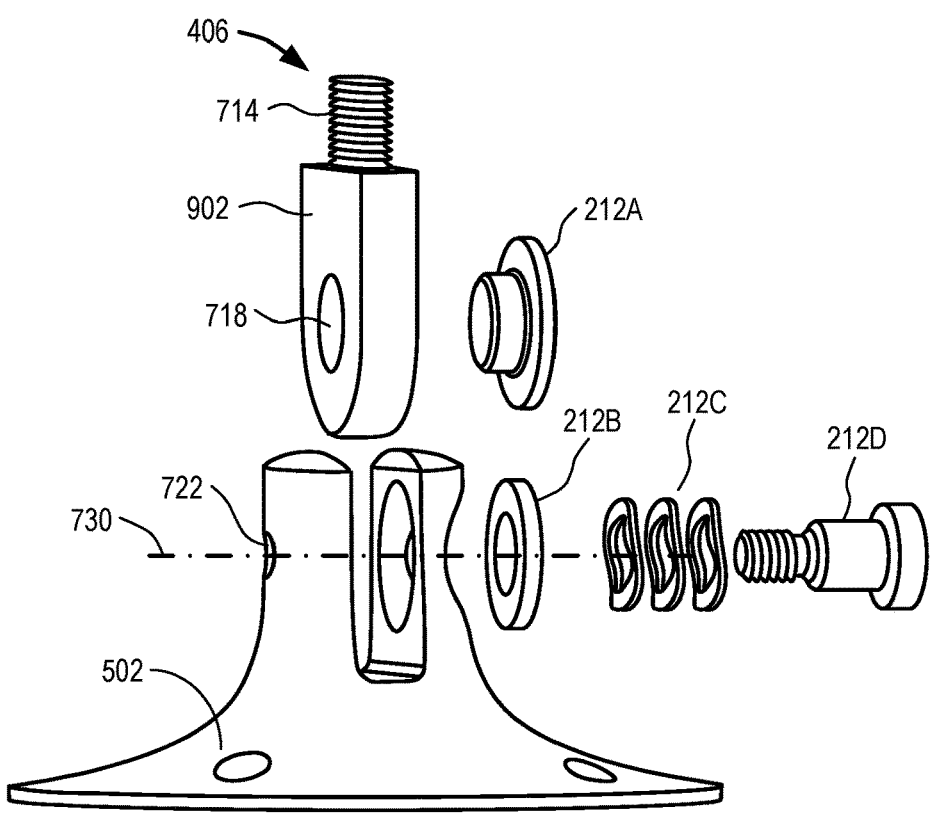
FIG. 9B is an exploded view of a joint that is assembled onto a hinge carrier to provide to a receiving element a limited movement range at a second degree of freedom of motion shown in FIG. 9A in accordance with some implementations.

FIG. 9B is an exploded view of a joint 212 that is assembled onto a hinge carrier 502 to provide to a receiving element 206 a limited movement range at a second degree of freedom of motion shown in FIG. 9A in accordance with some implementations. The second fastener structure 406 includes a screw structure 714 on its top half and a collar 902 on its bottom half, and a joint hole 718 is formed on the collar 902. In some implementations, both the screw structure 714 and the collar 902 are flattened to have two substantially flat surfaces, such that they fit into a base opening slot 716 on the base assembly 208. In some implementations as shown in FIG. 9B, the screw structure 714 has a screw diameter that fits into the base opening slot 716, while the collar 902 is flattened for fitting into the base opening slot 716. While the top half of the second fastener structure 406 is fastened into the first fastener structure 404, the bottom half of the second fastener structure 406 is fastened onto a hinge carrier 502 to form the joint 212 that can rotate around the joint hole 718.

The hinge carrier 720 is used as a platform to create the joint 212. The joint 212 includes a plurality of joint fasteners 212A-212D that further includes a collar bushing 212A, a thrust bushing 212B, a spring washer set 212C and a shoulder screw 212D. The joint fasteners 212A-212D together fasten the bottom half of the second fastener structure 406 onto a carrier slot 720 of a hinge carrier 502. The collar bushing 212A and the thrust bushing 212B provide side to side location and smooth bearing surfaces in contact with the collar 902. Additionally, the spring washer set 212C provides positive tension on the shoulder screw 212D, and creates frictional resistance and/or torque around a hinge axis 730 when the hinge screw 212D is tightened through the joint hole 718 and a screw hole 722 on the hinge carrier 502 to form the joint 212. The hinge axis 730 passes through the center of the joint hole 718 on the second fastener structure 406, and substantially overlaps the flipping axis 220 associated with the second degree of freedom of motion of the receiving element 206 with respect to the base assembly 208.

As explained above with reference to FIGS. 7E and 7F, when the hinge carrier 502 is assembled into the base 210, the screw structure 714 of the second fastener structure 406 extends beyond the base opening slot 716. The second fastener structure 406 is configured to rotate around the hinge axis 730 while being constrained within the base opening slot 716. When the screw structure 714 of the second fastener structure 406 is fastened with the first fastener structure 404, the receiving element 206 is mounted onto the base assembly 208, and therefore can flip with respect to its flipping axis 220 (i.e., the hinge axis 730) to provide the second degree of freedom of motion for a module mounted onto its module holding structure 214.

Figure 10A:
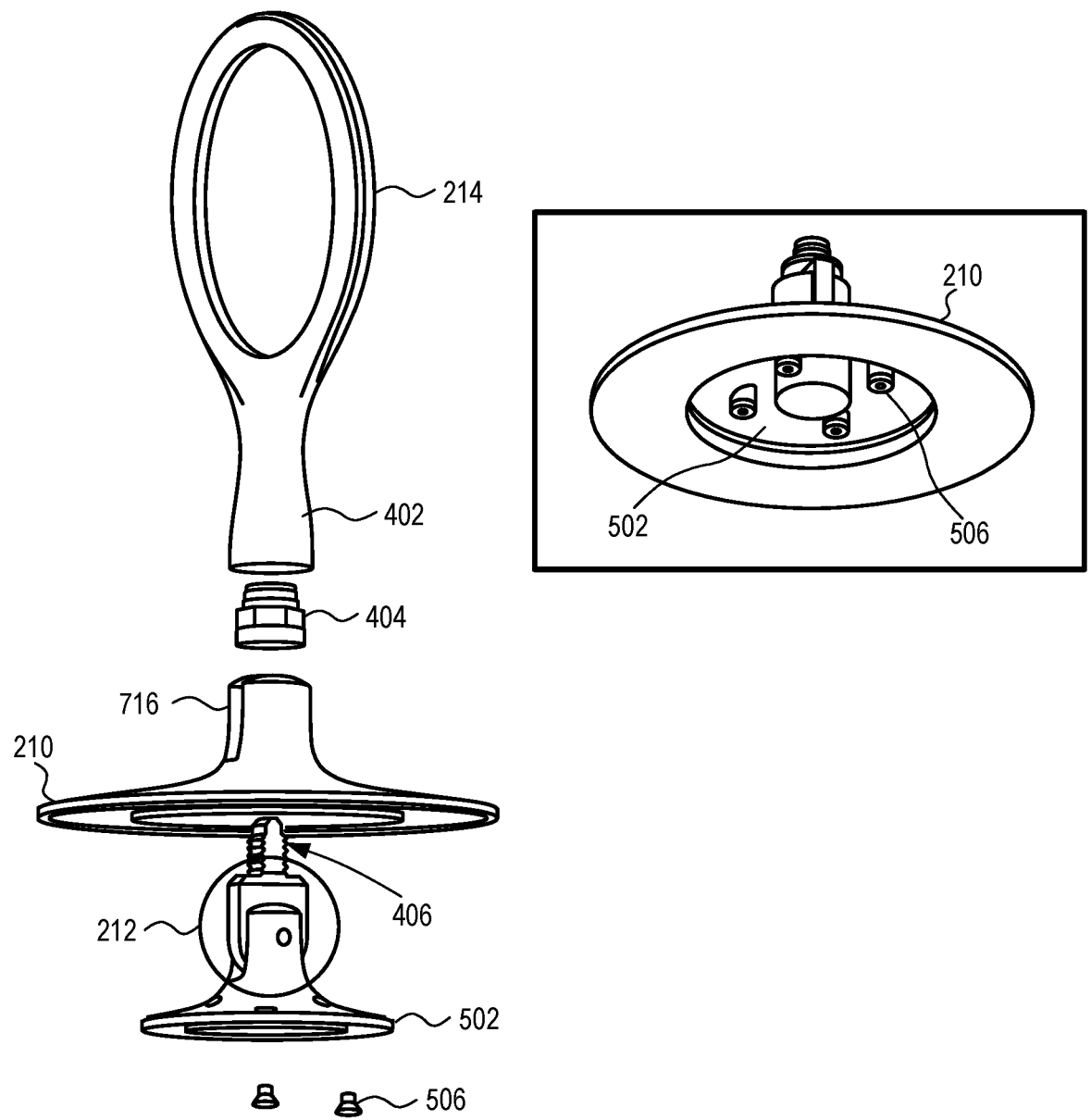
FIGS. 10A and 10B illustrate a process for assembling a stand assembly in accordance with some implementations.
Figure 10B:
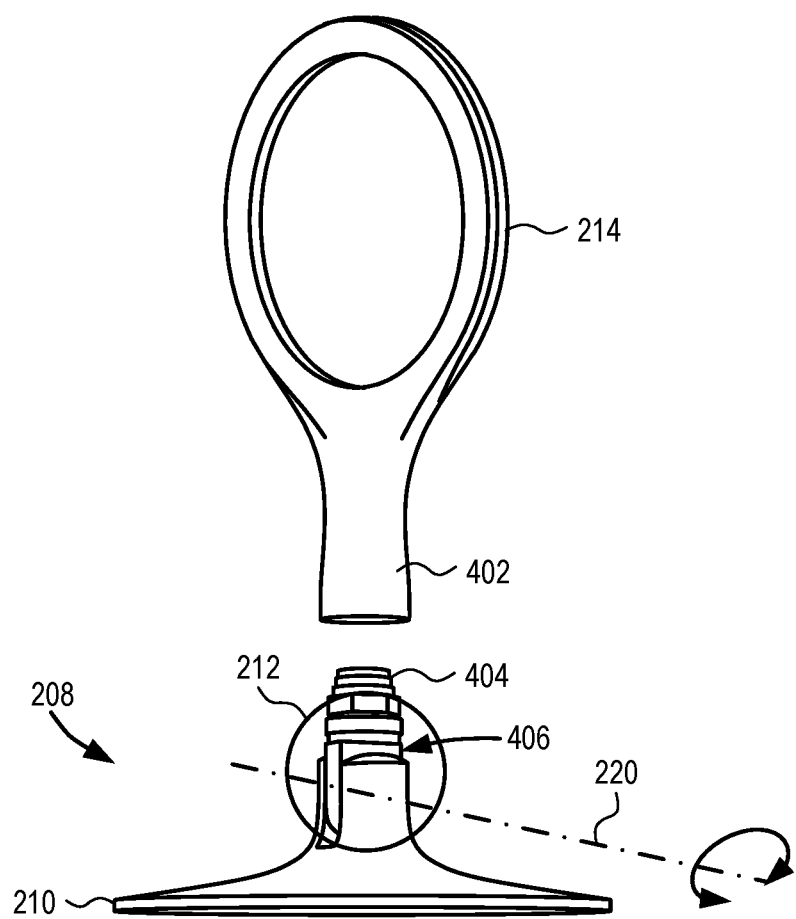

FIGS. 10A and 10B illustrate a process 1000 for assembling a stand assembly 202 in accordance with some implementations. As shown in FIG. 10A, a second fastener structure 406 is mounted on a hinge carrier 502 to provide a joint 212. The hinge carrier 502 is then assembled to a base 210, and fixed thereon via one or more base fasteners 506. In some implementations, as shown in the inset of FIG. 10A, the one or more base fasteners 506 include screws that are fastened through screw holes on a bottom surface of the hinge carrier 502, and anchored onto screw holes inside the base 210. As such, the hinge carrier 502 is fully assembled to the base 210 to provide a base assembly 208 in which the second fastener structure 406 extends from a base opening slot 716 of the base 210.

In some implementations, a standalone first fastener structure 404 is then tightened onto the exposed second fastener structure 406 of the base assembly 208, until the first fastener structure 404 reaches a tightened position of its full range of motion. It is noted that the tightened position of the first fastener structure is associated with an end position (FIG. 6A or 6C) that the receiving element 206 has within a first part of a first full range of motion associated with the first degree of freedom. After the first fastener structure 404 is tightened onto the second fastener structure 406, the module holding structure 214 and the extended portion 402 of the receiving element 206 is pressed onto the first fastener structure 404 to mount the receiving element 206 to the base assembly 208. After the mount press, the first fastener structure 404 is mechanically coupled inside the extended portion 402 of the receiving element 206. In some implementations, the first fastener structure 404 cannot be detached from the receiving element 206 without causing damage to the first fastener structure 404 or the receiving element 206.

In some implementations, after it is determined that the first fastener structure 404 reaches its tightened position, the receiving element 206 is reversely twisted at the first degree of freedom of motion by a first angle to orient the receiving element 206 to a nominal position (FIG. 6B). At the nominal position, the module holding structure 214 of the receiving element 206 is aligned in parallel or overlaps with both the twisting axis 218 and the flipping axis 220, and therefore, the receiving element 206 and a module received thereby are configured to face substantially up when they are flipped down via the joint 212 at the second degree of freedom of motion.

In some implementations, the first angle is half of a first part of a first full range of motion associated with the first degree of freedom of motion. Stated another way, the nominal position is located substantially in the middle of the first part of the first full range of motion associated with the first degree of freedom of motion. To obtain such a nominal position, the module holding structure 214 of the receiving element 206 needs to be properly oriented prior to and during the mount press according to the end position associated with the first part of the first full range of motion associated with the first degree of freedom as shown in FIG. 6A. Under some circumstances, the module holding structure 214 of the receiving element 206 is not properly oriented prior to and during the mount press according to the end position associated with the first degree of freedom as shown in FIG. 6A. The first part of the first full range of motion is not centered at the nominal position. The receiving element 206 has a larger range of motion on one of the clockwise and counterclockwise directions than the other of these two directions.

Alternatively, in some implementations not illustrated in FIGS. 10A and 10B, the first fastener structure 404 is attached to the receiving element 206 before it is fastened onto the second fastener structure 406 of the base assembly 208. The first fastener structure 404 needs to be aligned to the module holding structure 214 properly, such that when the receiving element 206 is fastened onto the base assembly 208, the resulting stand assembly 202 properly provides the first part of a first full range of motion and the nominal position both associated with the first degree of freedom of motion.

Figure 11:
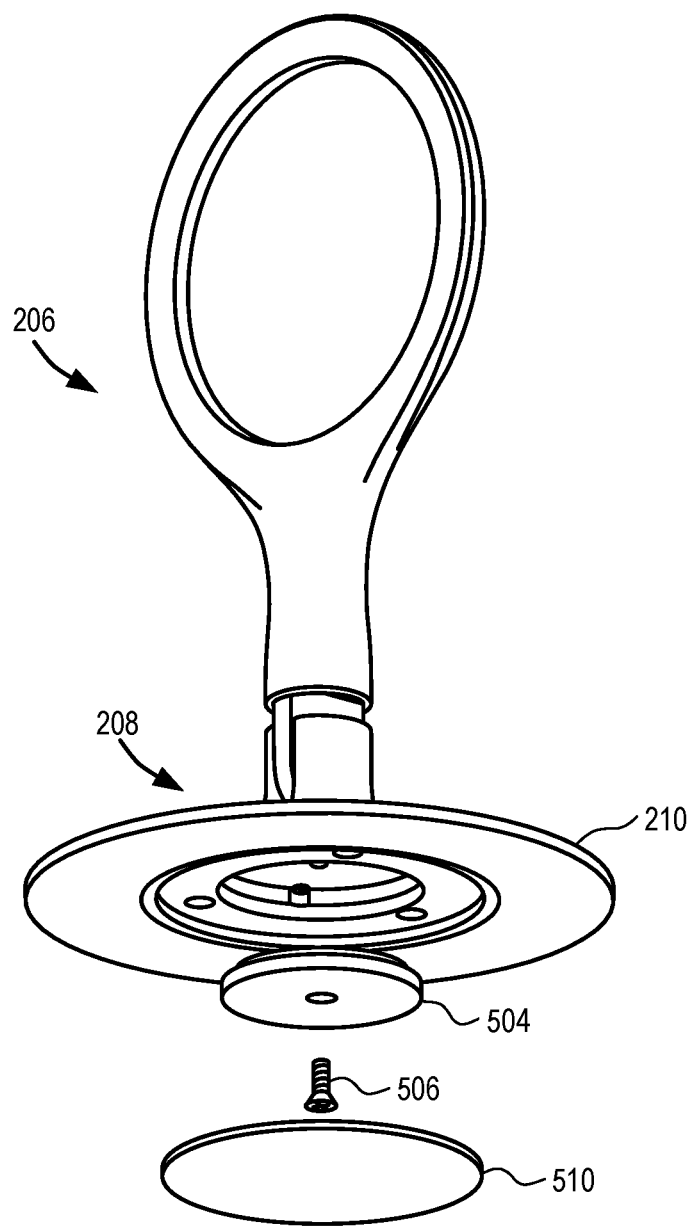
FIG. 11 is an exploded view of a stand assembly that includes a magnet plate in its base assembly in accordance with some implementations.

FIG. 11 is an exploded view of a stand assembly 202 that includes a magnet plate 504 in its base assembly 208 in accordance with some implementations. The magnet plate 504 is mechanically coupled to the base 210 such that the magnet plate 502 is adjacent to or forms a portion of a bottom surface of the base 210. The magnet plate 504 has a bottom surface area that is smaller than a surface area of the bottom surface of the base 510. Specifically, in some implementations, the magnet plate 504 is mechanically coupled to the base 210 using one or more magnet fasteners 506. Optionally, the magnet plate 504 is directly coupled to the base 210, or indirectly coupled to the hinge carrier 502 that is configured to fit into and couple to the base 210.

In some implementations, the base assembly 208 further includes a cover plate 510. Optionally, the cover plate 510 is made of plastic, metal or other materials. The cover plate 510 is glued onto the bottom surface of the base 510 to cover the magnet plate 504 that has been mechanically coupled to the base 510, and the magnet plate 504 is sandwiched between the bottom surface of the base 210 and the cover plate 510. The cover plate 510 has a surface area that is substantially equal to or slightly larger than that of the magnet plate 504 such that the cover plate 510 entirely seals the magnet plate inside the base assembly 208. As such, in some implementations, mechanical fasteners of the base assembly 208 are structurally visible to the user of the stand assembly 202 except the joint 212.

In some implementations, the base assembly 208 further includes one or more rubber patches 512 that are attached to a bottom surface of the base assembly 208 to provide additional friction between the stand assembly 202 and the supporting surface against which the base is rested. In an example (FIG. 5), the one or more rubber patches 512 includes a rubber ring that is attached to the bottom surface of the base assembly 208 and surrounds the cover plate 510.

Figure 12A:
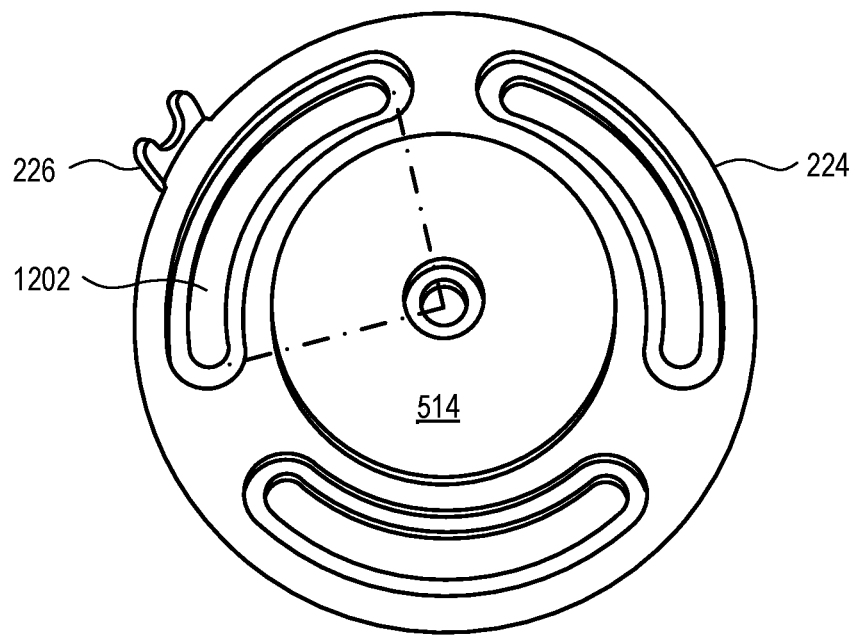
FIG. 12A illustrates a mount structure or mounting a stand assembly onto a mounting surface in accordance with some implementations.

FIG. 12A illustrates a mount structure 224 for mounting a stand assembly 202 onto a mounting surface in accordance with some implementations. At least part of the mount structure 224 is made of magnetically attractable material, e.g., iron, steel, copper, and brass. The stand assembly 202 is mounted onto the mounting surface when the base 210 of the base assembly 208 magnetically adheres onto the mount structure 224. In some implementations, the at least part of the mount structure 224 includes a magnetically attractable plate 514 that has been integrated in the mount structure 224 before they are shipped to a user of the stand assembly 202.

The magnetic attraction force between the base 210 of the stand assembly 202 and the mount structure 226 enables secure attachment of an electronic device module that is mounted onto the mounting surface using the stand assembly 202. Such secure attachment satisfies one or more Underwriters Laboratories (UL) standards that set forth at least safety requirements for mounting the electronic device module onto a mounting surface. An example UL standard is UL 2442 Standard for Wall- and Ceiling-Mounts and Accessories, which applies to devices that provide structural support for the mounting of audio/video equipment, information technology equipment, and similar products, to the building structure and is intended for indoor use only.

The mount structure 224 has a surface area that is substantially larger than or equal to that of the bottom surface of the base assembly 208, and includes a cable guide structure 226 at the circumference of the mount structure 224. The cable guide structure 226 is configured to guide a power or data cable that electrically couples a module 204 received in the receiving element 206 to an external power supply or another electronic device (e.g., a computational machine). Specifically, one end of the power or data cable is electrically coupled to a connection port 306 of the module 204, while the other end is electrically coupled to the external power supply or the other electronic device. An intermediate node at the power or data cable is held by the cable guide structure 226, thereby protecting the power or data cable from wiggling around and disconnecting from the connection port 206.

Further, the mount structure 224 includes one or more open slots 1202 each having a respective width that matches a dimension of a head of a mount fastener (e.g., a screw or a nail). The open slots 1202 are configured to receive the mount fasteners 518. The mount structure 224 can be attached and fixed onto the mounting surface when the mount fasteners 518 are fastened onto the mounting surface via the open slots 202 of the mount structures 224. The open slots 1202 have predetermined lengths configured to accommodate an adjustment of an orientation of the mount structure 224 when the mount fasteners 518 are loosened from the mounting surface. In some implementations, the orientation of the mount structure 224 is adjusted for the purposes of varying the location of the cable guide structure 226 with respect to a module mounted on the mount structure 224 (e.g., the camera module 204). The predetermined lengths of the open slots as presented here are associated with an adjustment angle of 90 degrees for adjusting the orientation of the mount structure 224 and the location of the cable guide structure 226.

Figure 12B:
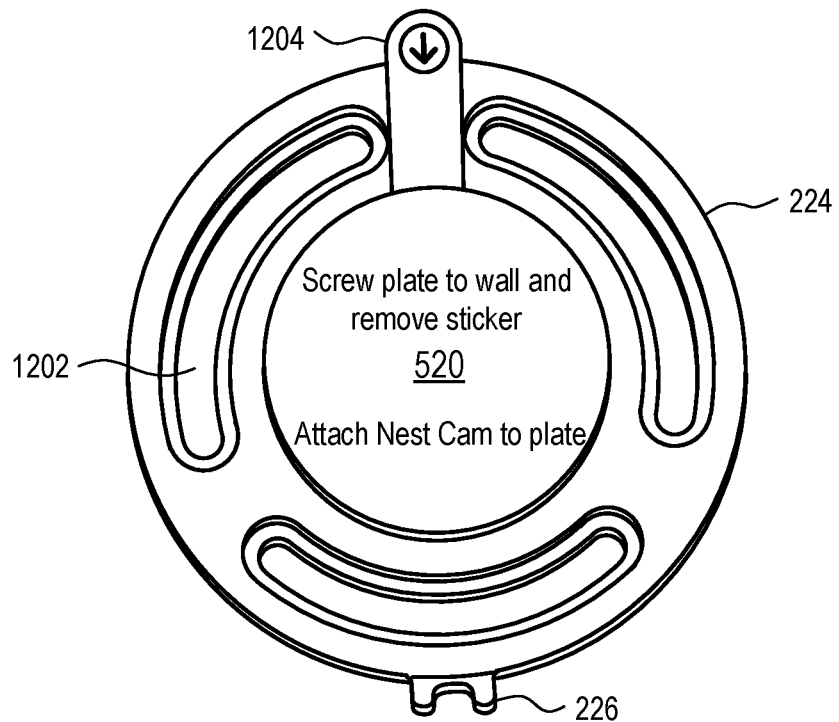
FIG. 12B illustrates another exemplary mount structure onto which a detachable foam plate is attached in accordance with some implementations.

FIG. 12B illustrates another exemplary mount structure 224 onto which a detachable foam plate 520 is attached in accordance with some implementations. Specifically, the detachable foam plate 520 is attached onto the magnetically attractable part of the mount structure 224. In some implementations, the detachable foam plate 520 includes a back surface that is sticky, and adheres to the surface of the magnetically attractable part like a sticker. The front surface of the detachable foam plate 520 includes one or more instructions for assembling the stand assembly 202. In this example, the one or more instructions include an arrow that indicates that a user can peel off the detachable foam plate 520 from the mount structure 224. Additionally, the one or more instructions include specific language to guide the user to "screw plate to wall and remove sticker," and "attach Nest Cam to plate."

When the mounting structure 224 is mounted onto a mounting surface, it is arranged according to a preferred orientation such that the cable guide structure 226 is located at a preferred location (e.g., on a bottom rim of the mounting structure 224, or below a module after the module is mounted on the stand assembly 202). In some implementations, the one or more instructions on the detachable foam plate 520 include a notice that reminds the user of orienting the mount structure 224 according to the preferred orientation.

In some implementations, the detachable foam plate 520 includes a tab 1204. The tab 1204 is oriented according to the preferred orientation of the mounting structure 224, and used to guide the attachment of the mount structure 224 onto the mounting surface. Specifically, the detachable foam plate 520 is attached onto the mounting structure 224 with the tab 1204 aligned to the preferred orientation of the mounting structure 224. When the user mounts the mount structure 224 according to the orientation of the tab 1204, the cable guide structure 226 is disposed at its preferred location. In a specific example, the user orients the tab 1204 of the mounting structure 224 to an upward direction, and obtains the preferred orientation of the mounting structure 224 and the preferred location of the cable guide structure 226 automatically.

Figure 12C:
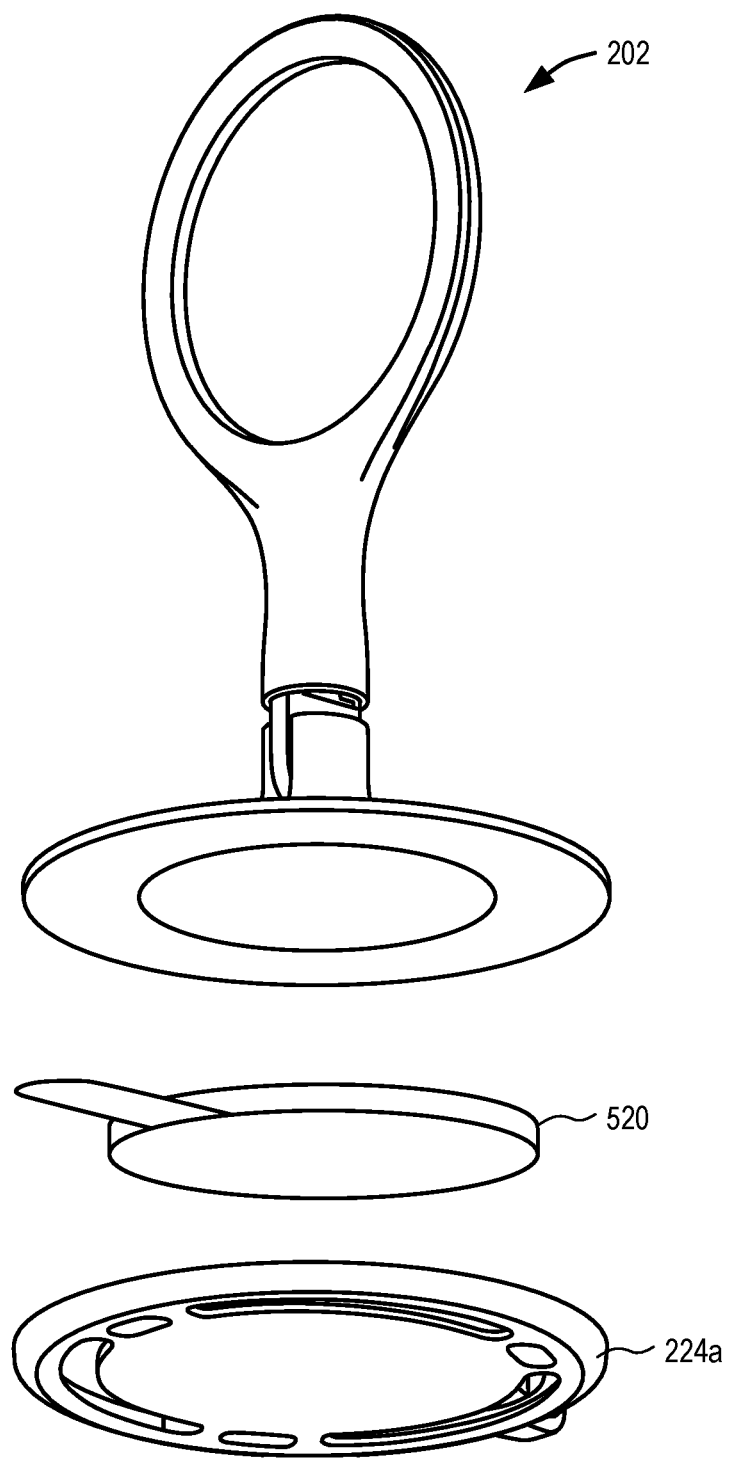
FIG. 12C is an exploded view of a stand assembly, a detachable foam plate and a mount structure in accordance with some implementations.

FIG. 12C is an exploded view of a stand assembly 202, a detachable foam plate 520 and a mount structure 224a in accordance with some implementations. After the mount structure 224a is fixed onto the mounting surface with a preferred orientation, the tab 1204 is peeled off, and the stand assembly 202 is placed on top of the mount structure 224a. The stand assembly 202 adheres to the mount structure 224a firmly by way of the magnetic attraction force that exists between the magnet plate 504 sealed inside the base 210 and the magnetically attractable part 514 of the mount structure 224a. In some implementations, the magnetic attraction force satisfies the UL standards for mounting an electronic device onto a mounting surface safely, and the stand assembly 202 would not be easily detached from the mount structure 224a.

Conversely, the detachable foam plate 520 is applied to reduce the magnetic attraction force between the base 210 and the mount structure 224a, before the mount structure 224 is fully prepared for receiving the stand assembly 202. The detachable foam plate 520 is attached onto the mount structure 224a to increase a distance and thereby reduce the magnetic attraction force between the magnet plate 504 of the base 210 and the magnetically attractable part 514 of the mount structure 224. The reduced magnetic attraction force allows a user to separate the stand assembly 202 from the mount structure 224a conveniently without resorting to any tool, particularly before the mount structure 224a is fixed onto the mounting surface and prepared to receive the stand assembly 202.

Figure 13A:
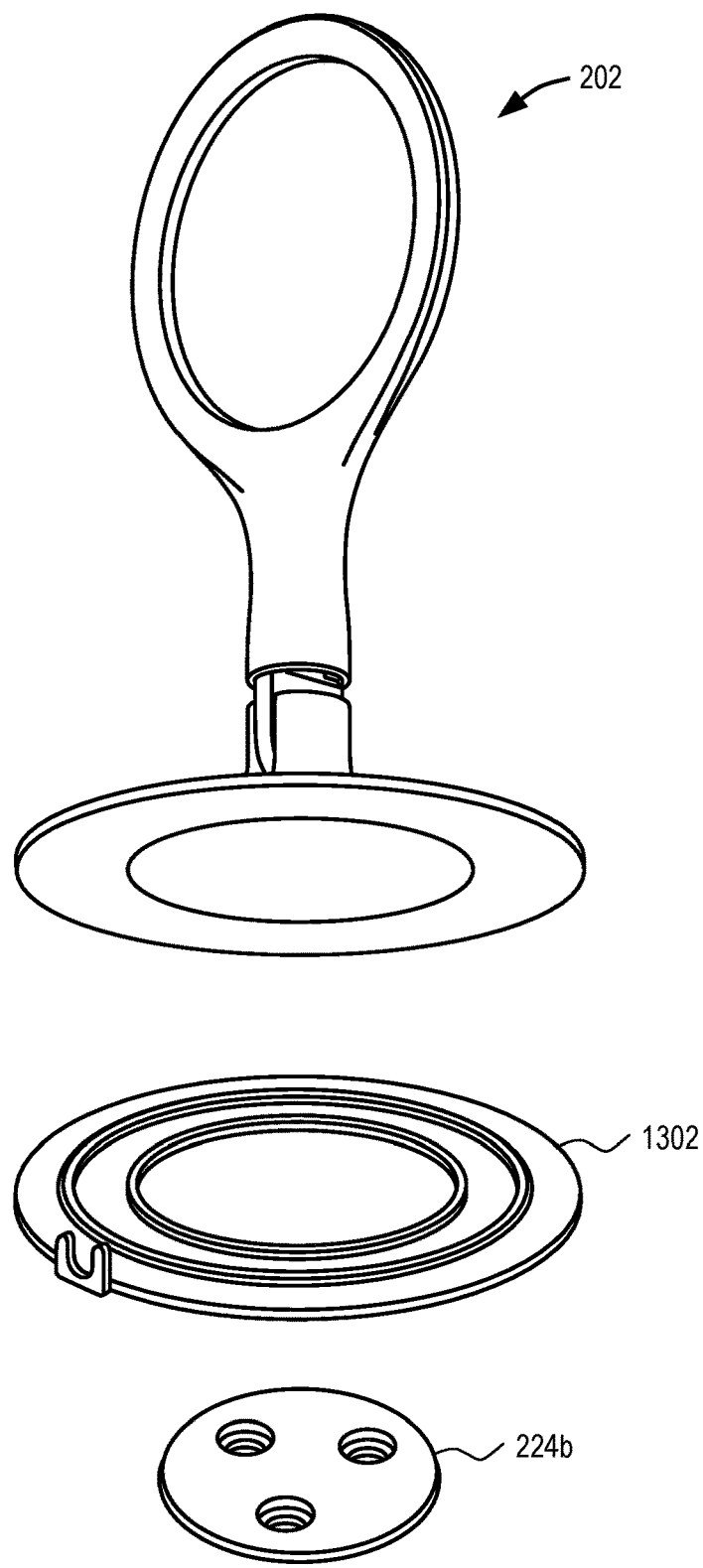
FIG. 13A is an exploded view of a stand assembly, a cable guide ring and a mount structure that function together to support a module on a mounting surface in accordance with some implementations.
Figure 13B:
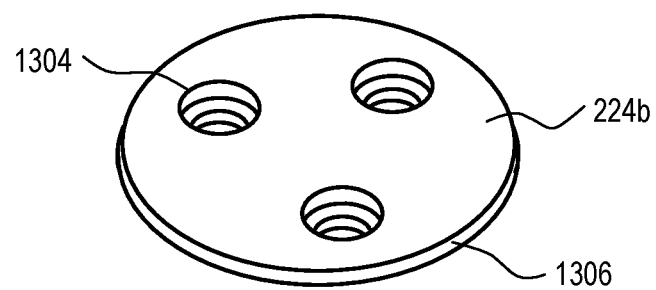
FIG. 13B illustrates another mount structure in accordance with some implementations.
Figure 13C:
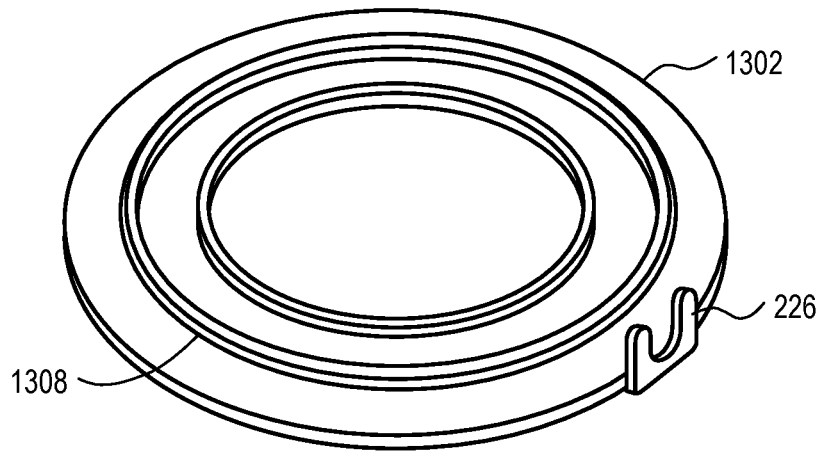
FIG. 13C illustrates a cable guide ring in accordance with some implementations.

FIG. 13A is an exploded view of a stand assembly 202, a cable guide ring 1302 and a mount structure 224b that function together to support a module 204 on a mounting surface in accordance with some implementations. FIG. 13B illustrates another mount structure 224b in accordance with some implementations, and FIG. 13C illustrates a cable guide ring 1302 in accordance with some implementations. At least part of the mount structure 224b is made of magnetically attractable material, e.g., iron, steel, copper, and brass. The stand assembly 202 is mounted onto the mounting surface when the base 210 of the base assembly 208 magnetically adheres onto the mount structure 224b. The mount structure 224 has a surface area that is substantially smaller than that of the bottom surface of the base assembly 208, and does not include a cable guide structure 226. Rather, the functions of the cable guide structure 226 are provided separately by a cable guide ring 1302.

The mount structure 224b is substantially flat, and includes a plurality of openings 1304 each having a respective dimension that matches that of a head of a mount fastener 518 (e.g., a screw or a nail). The openings are configured to receive the mount fasteners. The mount structure 224b is attached and fixed onto the mounting surface, when the mount fasteners 518 are fastened onto the mounting surface via the openings 1304 of the mount structure 224b.

The cable guide ring 1302 has an inner diameter that is substantially larger than a diameter of the mount structure 224b. When the stand assembly 202 is mounted onto the mounting surface, the cable guide ring 1302 surrounds the mount structure 224, comes into contact with the mounting surface, and is thereby sandwiched between the mounting surface and the base 210 of the stand assembly 202. Further, the cable guide ring 1302 has an outer diameter that is substantially larger than or equal to that of the bottom surface of the base assembly 208. The cable guide ring 1302 further includes a cable guide structure 226 located at its outer circumference for fixing a power or data cable. Optionally, the power or data cable is configured to electrically couple the module 204 received at the receiving element 206 of the stand assembly 202 to an external power supply or a separate electronic device.

In some implementations, the circumference of the mount structure 224 includes a groove, and the mount structure 224b further includes an O-ring 1306. The O-ring 1306 is configured to be seated in the groove of the mount structure 224. The O-ring is compressed and creates a seal at an interface when the card guide ring 1302 is assembled onto the mount structure 224b. In some implementations, the cable guide ring 1302 includes one or more protrusions 1308 on its surface to increase its friction with the bottom surface of the base 210. The seal provided the O-ring 1306 and the friction provided by the surface protrusions 1308 prevent the card guide ring 1302 from wobbling between the stand assembly 202 and the mounting surface, and thereby enable a secure cable guiding function for the power or data cable electrically coupled to the module 204.

Referring to FIGS. 13A-13C, the mount structure 224b has a relatively simple form factor, and is easy to manufacture at an affordable cost. In some implementations, the stand assembly 202 is associated with more than one mount structures 224b that can be mounted onto more than one mounting surfaces in a smart home environment. A user of the module 204 can conveniently remove the stand assembly 202 and the cable guide ring 1302 from one mount structure 224b located at a first location, and mount them to another mount structure 224b located at a second location without moving the mount structure 224.

Figure 14A:
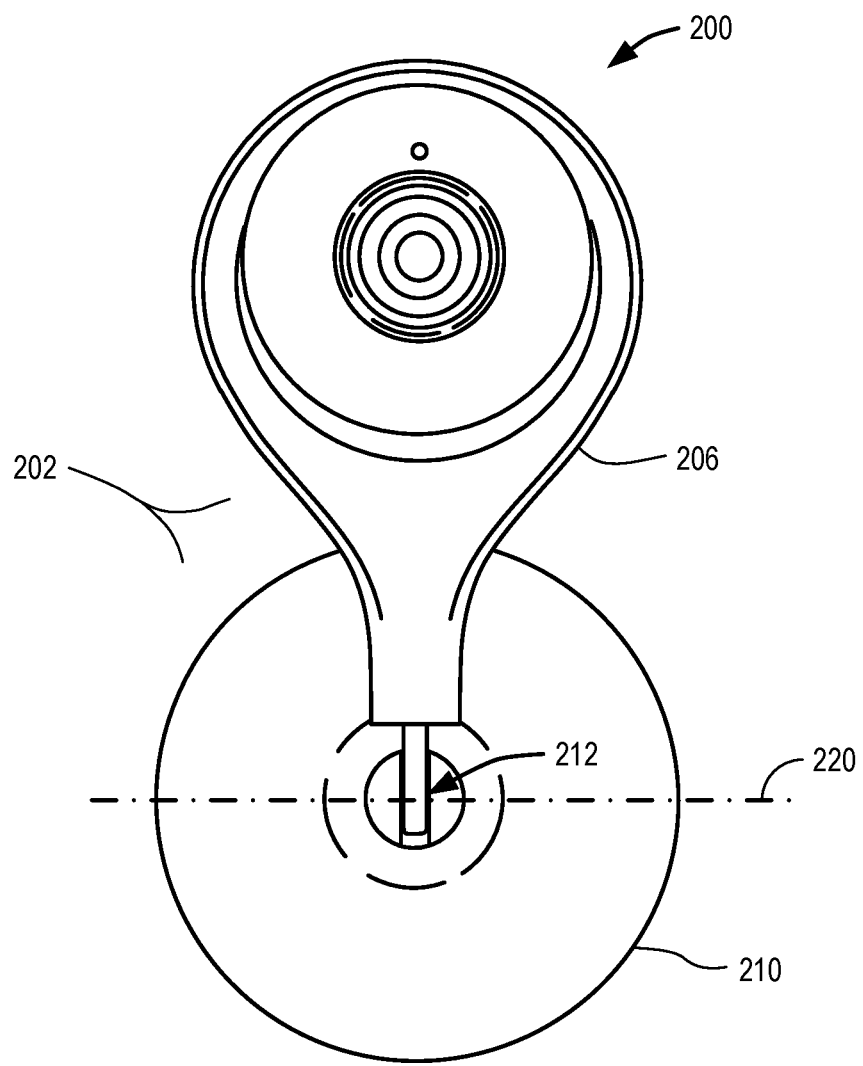
FIG. 14A is a top view of a camera assembly in which a receiving element and a camera module 204 mounted thereon are packaged in accordance with some implementations.

FIG. 14A is a top view of a camera assembly 200 in which a receiving element 206 and a camera module 204 mounted thereon are packaged in accordance with some implementations. The receiving element 206 and the camera module 204 are flipped down to an end position, and face substantially up in the camera assembly 200. As explained above with reference to FIGS. 6A-6F, the stand assembly 202 is associated with a nominal position at which the module holding structure 214 of the receiving element 206 is arranged to align in parallel or overlap with both the twisting axis 218 (not shown in FIG. 14A) and the flipping axis 220. In accordance with a second degree of freedom of motion, the receiving element 206 and the camera module 204 can be flipped around the flipping axis 220 that passes through a joint 212 and lies substantially in parallel with a planar surface of the base 210. As such, the receiving element 206 and the camera module 204 mounted thereon are flipped down and face substantially up (i.e., face opposite to the planar surface of the base 210).

FIGS. 14B-14F illustrate a packaging process 1400 for packaging a camera assembly 200 shown in FIG. 14A and its accessories in a multilayer shipping package in accordance with some implementations. The multilayer shipping package includes a lid box 1402 and a container box 1404. The container box 1404 is configured to contain the camera assembly 200 and its accessories, and the lid box is configured to cover the container box 1404. The boxes 1402 and 1404 of the multilayer shipping package further include a plurality of packaging layers, e.g., four layers including layers 1406-1412 in this specific example, for organizing the camera assembly 200 and its accessories in a compact, reliable, and user friendly manner.

Figures 14B, 14C:
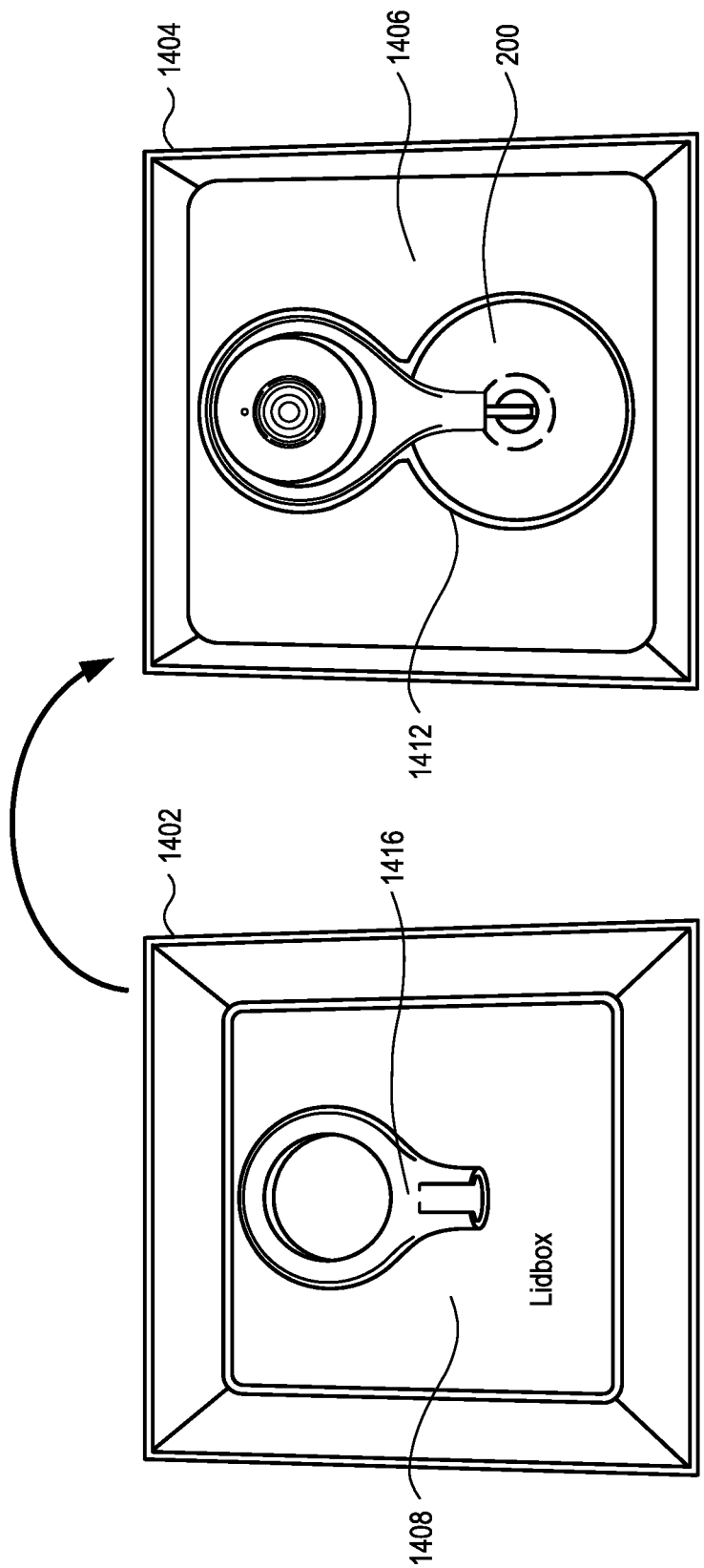
FIGS. 14B-14F illustrate a packaging process for packaging a camera assembly as shown in FIG. 14A and its accessories in a multilayer shipping package in accordance with some implementations.
Figure 14D:
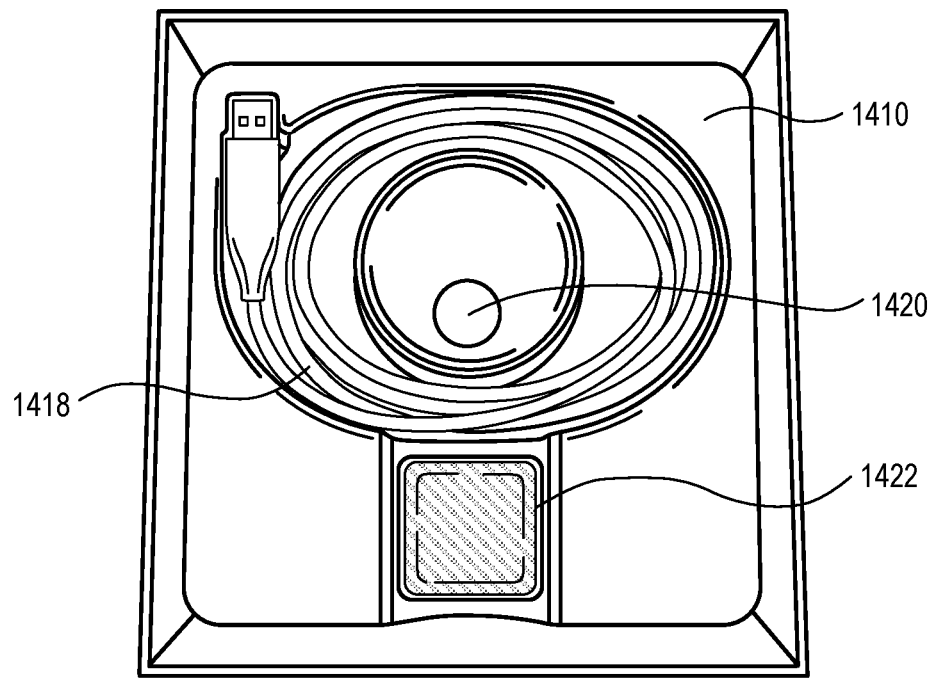
Figure 14E:
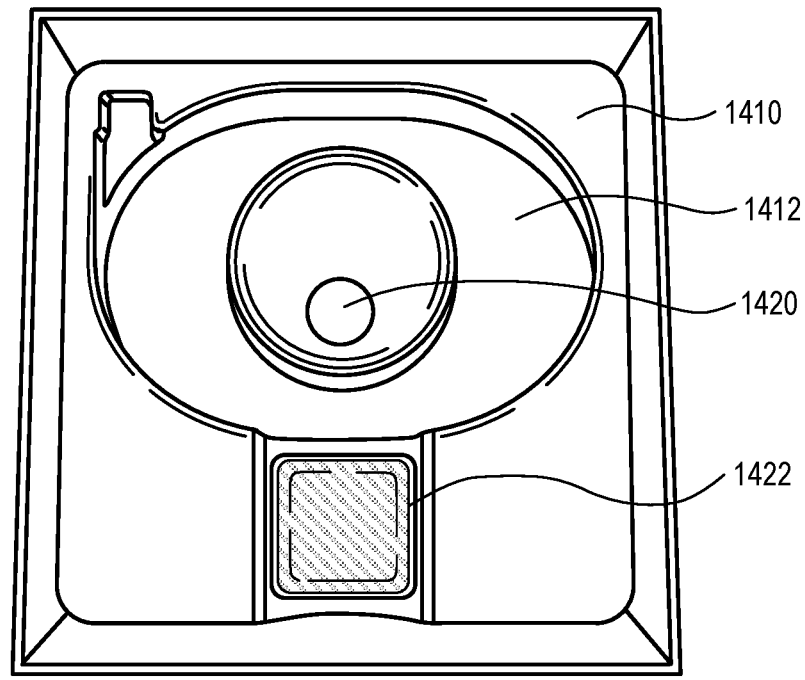
Figure 14F:
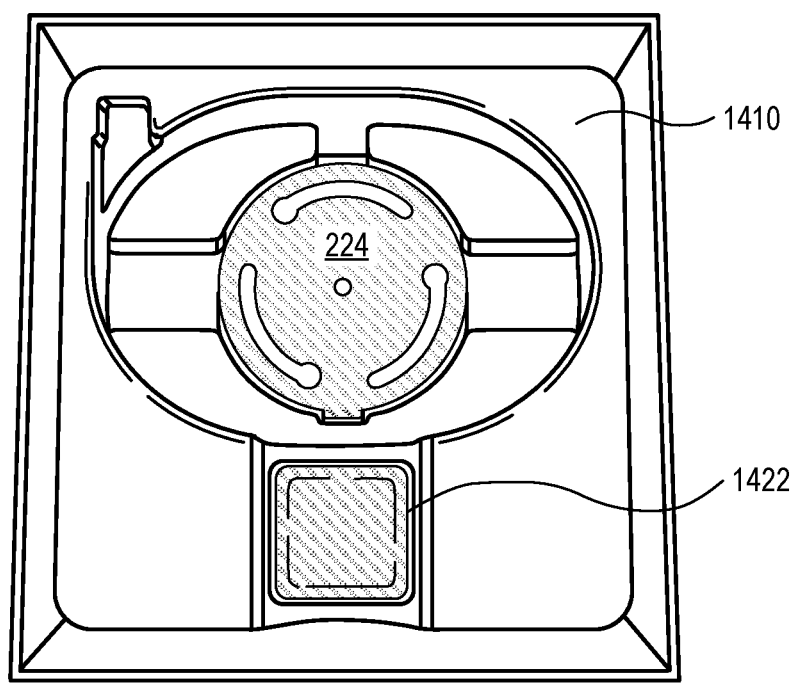

When a user opens the shipping package shipped from a retailer or a manufacturer, the user sees that a camera assembly 200 lays flat on a top layer 1406 of the container box 1404 (FIG. 14C). The top layer 1406 includes a first recess 1412 that is formed according to a contour of the camera assembly 200 and configured to hold the camera assembly 200 firmly. On the other hand, the lid box 1402 includes a lid layer 1408, and the lid layer 1408 has a lid recess or protrusion 1416 that is also configured at least according to a contour of the receiving element 206 of the camera assembly 200. When the lid box 1402 is flipped over to cover the container box 1404, the camera assembly 200 is securely held between the lid recess or protrusion 1416 of the lid layer 1408 and the first recess 1412 of the top layer 1406, and thereby protected from some shipping damages that can occur in transit.

In some implementations, the first recess 1412 of the top layer 1406 includes one or more cutout openings (not shown in FIG. 14C). When the camera assembly 200 is removed from the first recess 1412 of the top layer 1406, the one or more cutout openings on the recess allow the user to pull the top layer 1406 out of the container box 1404 easily.

Further, after the top layer 1406 is removed from the container box 1404, a subset of camera accessories (e.g., a power cord and a power adapter) is exposed. In some implementations, the subset of camera accessories is supported by one or more underlying layers (e.g., a bottom layer 1410 and an intermediate layer 1412). The bottom layer 1410 includes a second recess 1418, and the intermediate layer 1412 is placed inside the second recess 1418 of the bottom layer 1410. A power cord is supported by the intermediate layer 1412 and held within the second recess 1418. The intermediate layer 1412 further includes a cutout opening 1420 that allows the user to pull the intermediate layer 14012 out of the second access 1418 of the bottom layer 1410.

After the intermediate layer 1412 is removed, a mount structure 224 that lies underneath the intermediate layer 1412 is exposed. The mount structure 224 is disposed at the bottom of the second access 1418 of the bottom layer 1410. In some implementations, the second access 1418 of the bottom layer 1410 is configured to hold one or more mount structures 224 and a card guide ring 1302 as shown in FIGS. 13A-13C.

In some implementations, the bottom layer 1410 further includes a third recess 1422 that is configured to hold the power adapter.

In some implementations, a user manual is disposed under the top layer 1406 and above the accessories that are organized and held by the intermediate and bottom layers 1410 and 1412.

In some implementations, the packaging layers 1406-1412 packaged inside the shipping package are made of recycled paper, and the recycled paper include at least a threshold amount of starch quantities. In an example, the threshold amount of starch quantities is equal to 40% of the packaging layers in weight.

Figure 15:
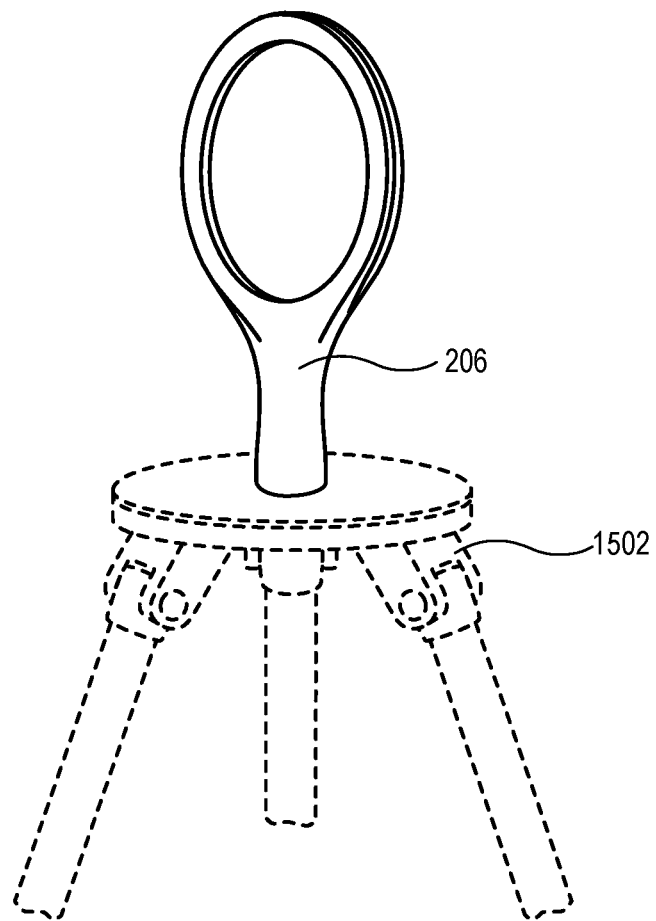
FIG. 15 illustrates a receiving element that is mechanically coupled on a standard tripod in accordance with some implementations.

FIG. 15 illustrates a receiving element 206 that is mechanically coupled on a standard tripod 1502 in accordance with some implementations. Specifically, a first fastener structure 404 includes a threaded screw hole that matches a tripod screw of a standard tripod, and the receiving element 206 is configured to mount on the standard tripod 1502 when the tripod screw is tightened into the threaded screw hole of the first fastener structure 404. In some implementations, the tripod screw is part of a tripod adaptor. The first fastener structure 404 is fastened to the tripod adaptor, and the tripod adaptor is further fastened onto the standard tripod 1502. In some implementations, to match the tripod screw of a commonly used standard tripod, the threaded screw hole on the first fastener structure 404 is a ¼-20 socket that has a ¼ inch diameter and 20 threads per inch at its screw length.

Figure 16:
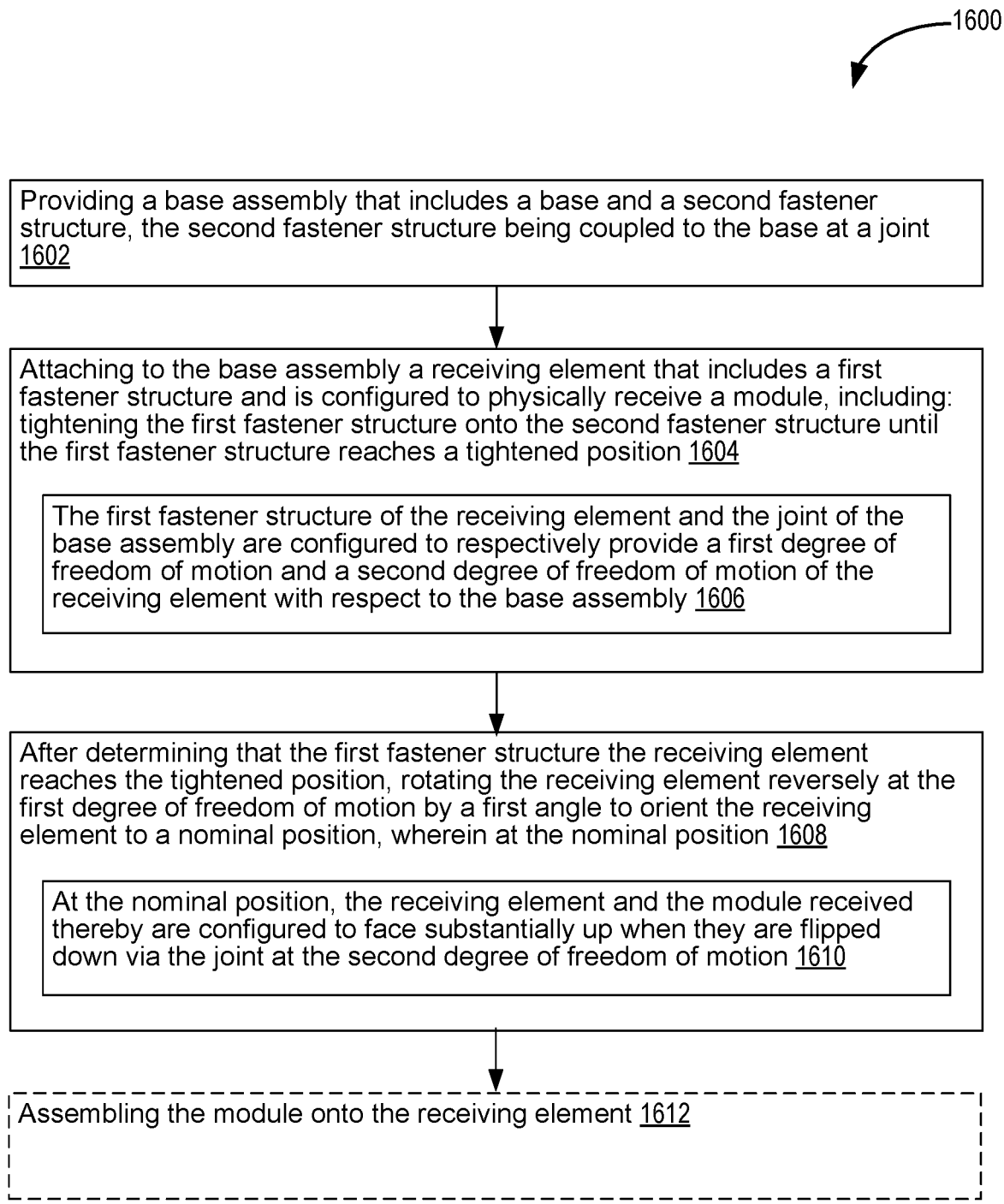
FIG. 16 is a flow chart of a method for packaging a stand assembly configured to support a module (e.g., a camera module) in accordance with some implementations.

FIG. 16 is a flow chart of a method 1600 for packaging a stand assembly 202 configured to support a module (e.g., a camera module 204) in accordance with some implementations. The stand assembly packaging method 1600 includes providing (1602) a base assembly 208 that includes a base 210 and a second fastener structure 406, and the second fastener structure 406 is coupled to the base 210 at a joint 212. As shown in FIGS. 10A and 10B, in some implementations, providing the base assembly 208 further includes: inserting the second fastener structure 406 into a base opening slot 716 on the base assembly 208, and forming the joint 212 by assembling the second fastener structure 406 in the base opening slot 716 using one or more joint fasteners. More details on the methods of providing the base assembly 208 including the joint 212 are explained above with reference to FIGS. 7D-7F and 9B.

The stand assembly packaging method 1600 further includes attaching (1604) to the base assembly 208 a receiving element 206. The receiving element 206 includes a first fastener structure 404 and is configured to physically receive the module 204. To attach the receiving element 206 to the base assembly 208, the first fastener structure 404 is tightened onto the second fastener structure 406 until the first fastener structure 404 reaches a tightened position. The first fastener structure 404 of the receiving element 206 and the joint 212 of the base assembly 208 are configured (1606) to provide a first degree of freedom of motion and a second degree of freedom of motion of the receiving element 206 with respect to the base assembly 208, respectively.

In some implementations, the receiving element 206 further includes a module holding structure 214 and an extended portion 402. To attach the receiving element 206 to the base assembly 208, after the first fastener structure 404 is tightened onto the second fastener structure 406, the module holding structure 214 and the extended portion 402 of the receiving element 206 are press mounted onto the first fastener structure 404 to mount the receiving element 206 to the base assembly 208.

The stand assembly packaging method 1600 further includes after determining that the first fastener structure 404 reaches the tightened position, rotating (1608) the receiving element 206 reversely at the first degree of freedom of motion by a first angle to orient the receiving element to a nominal position. At the nominal position, the receiving element 206 and the module 204 received thereby are configured (1610) to face substantially up when they are flipped down via the joint 212 at the second degree of freedom of motion. In some implementations, the first angle is substantially equal to half of a full range of motion of the first fastener structure 404. In a specific example, the first angle is substantially equal to 45 degrees. More details on the tightened position of the first fastener structure 404 and the nominal position of the receiving element 206 are explained above with reference to FIGS. 6A-6C.

In some implementations, the module is assembled (1612) onto the receiving element 206 to form a module assembly. When the module includes a camera module 204, a camera assembly is formed to support the camera module 204 assembled onto the receiving element 206.

As explained above, in some implementations, the movement of the receiving element 206 at the first degree of freedom has substantially consistent resistance through first part of a first full range of motion associated with the first degree of freedom of motion, and the movement of the receiving element 206 at the second degree of freedom has substantially consistent resistance through a second full range of motion associated with the second degree of freedom. Further, in some implementations, the first part of the first full range of motion associated with the first degree of freedom of motion is associated with a twisting angle, and the first angle is substantially equal to half of the twisting angle such that the nominal position is located at the center of the first part of the first full range of motion associated with the first degree of freedom of motion. In some implementations, the tightened position of the first fastener structure 404 is associated with an end position that the receiving element 206 has within the first part of the first full range of motion associated with the first degree of freedom. More details on the first and second degrees of freedom of motion of the receiving element 206 are explained above with reference to FIGS. 6A-6E.

In some implementations, the first fastener structure 404 of the receiving element 206 further includes a screw hole and a nylon-like bushing coupled at the end of the screw hole. The screw hole matches a screw structure of the second fastener structure 406, and has a predetermined thread length. The screw hole is configured to provide a second part of the first full range of motion when the first fastener structure is fastened onto the second fastener structure via the screw hole and the screw structure. The nylon-like bushing has a predetermined bushing depth, and provides the first part of the first full range of motion when the first fastener structure is fastened onto the second fastener structure via the screw hole and the screw structure. The second part of the first full range of motion is distinct from the first part of the first full range of motion. More details on the first and second fastener structures that enable the stand assembly packaging method 1600 are explained above with reference to FIGS. 7A-7C.

In some implementations, the stand assembly packaging method 1600 further includes flipping the receiving element 206 via the joint 212 at the second degree of freedom of motion until the receiving element 206 and the module 204 received thereby face substantially up. After the receiving element 406 is flipped via the joint 212, the assembly is placed within a shipping package. Specifically, the assembly is placed on a packaging layer (e.g., the layer 1406) inside the shipping package with the receiving element 206 and the module 204 received thereby at least partially held in a recess (e.g., the recess 1412) on the packaging layer. More details on a packaging process 1400 for packaging an assembly and its accessories in a multilayer shipping package are explained above with reference to FIGS. 14A-14F.

It should be understood that the particular order in which the operations in FIG. 16 have been described are merely exemplary and are not intended to indicate that the described order is the only order in which the operations can be performed. One of ordinary skill in the art would recognize various ways to package a stand assembly 202 as described herein. Additionally, it should be noted that details of other processes described herein with respect to method 1600 (e.g., FIG. 16) are also applicable in an analogous manner to method 1700 described below with respect to FIG. 17. For brevity, these details are not repeated here.

Figure 17:
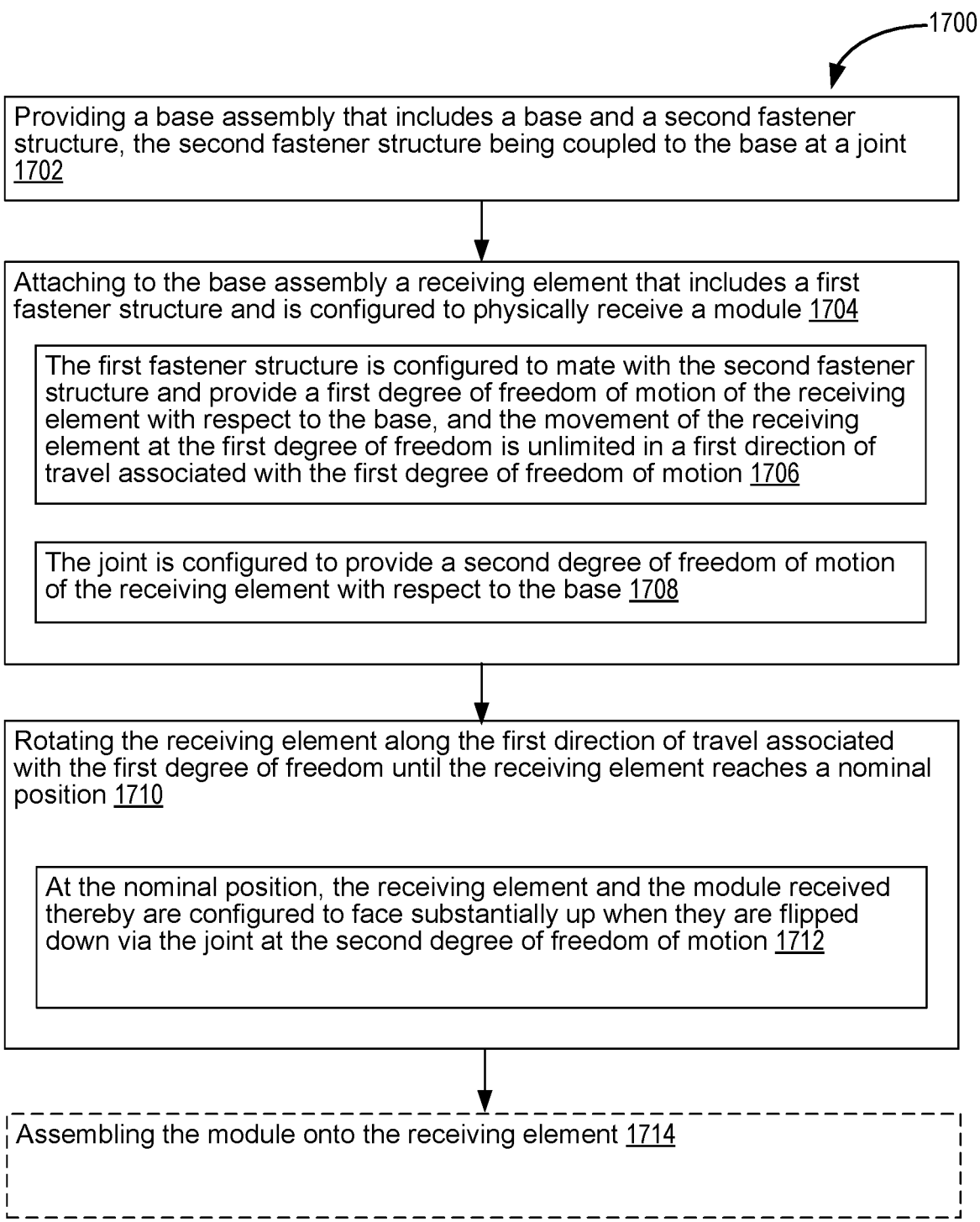
FIG. 17 is a flow chart of another exemplary method for packaging a stand assembly configured for supporting a module (e.g., a camera module) in accordance with some implementations.

FIG. 17 is a flow chart of another exemplary method 1700 for packaging a stand assembly 202 configured for supporting a module (e.g., a camera module 204) in accordance with some implementations. The stand assembly packaging method 1700 includes providing (1702) a base assembly 208 that includes a base 210 and a second fastener structure 406, and the second fastener structure 406 is coupled to the base 210 at a joint 212.

The stand assembly packaging method 1700 further includes attaching (1704) to the base assembly 208 a receiving element 206 that includes a first fastener structure 404 and is configured to physically receive the module 204. The first fastener structure 404 of the receiving element 206 is configured (1706) to mate with the second fastener structure 406 and provide a first degree of freedom of motion of the receiving element 206 with respect to the base. The movement of the receiving element at the first degree of freedom is unlimited in a first direction of travel associated with the first degree of freedom. The joint 212 is configured (1708) to provide a second degree of freedom of motion of the receiving element 206 with respect to the base. The movement of the receiving element at the second degree of freedom is limited in a direction of travel associated with the second degree of freedom. Further, in some implementations, the first degree of freedom is associated with a reverse direction of travel that is opposite to the first direction of travel associated with the unlimited movement at the first degree of freedom, and the first and second fastener structures 406 and 406 are unfastened when the receiving element 206 moves with respect to the base assembly 208 in the reverse direction of travel associate with the first degree of freedom.

In some implementations, the receiving element 206 is configured to move with respect to the base 210 at the first degree of freedom of motion when the first fastener structure 404 is fastened onto the second fastener structure 406 of the base assembly 208. The first fastener structure 404 of the receiving element 206 further includes a screw hole that matches a screw structure of the second fastener structure. The screw hole has a predetermined thread length, and provides the unlimited movement at the first degree of freedom of motion, when the first fastener structure 404 is fastened onto the second fastener structure 406 via the screw hole and the screw structure.

In some implementations, the first fastener structure further includes a shoulder screw 802, a sleeve bushing 804, a spring washer 806 and a screw hole, and the first fastener structure 404 is configured to be loosely suspended within the extended portion 402 of the receiving element 206 via the shoulder screw 802.

In some implementations, an extended portion 402 of the receiving element 206 includes a thread locker 812 embedded therein, and the first fastener structure 404 includes a shoulder screw 802. The shoulder screw 802 is configured to lock into place with the thread locker 812 for the purposes of fastening the first fastener structure 404 to the receiving element 206. Further, in some implementations, a low friction bushing 810 is fixed inside an extended portion 402 of the receiving element 206. In accordance with the unlimited movement of the receiving element at the first degree of freedom, the low friction bushing 810 wraps around the first fastener structure 404, and rotates as part of the receiving element 206 with respect to the base assembly 208, and with respect to the first fastener structure 404 when the first fastener structure 404 is tightened onto the second fastener structure 406 of the base assembly 208.

More details on the first fastener structure 404 that enables the stand assembly packaging method 1700 are explained above with reference to FIGS. 8B and 8C.

The stand assembly packaging method 1600 further includes (1710) rotating the receiving element 206 along the first direction of travel associated with the first degree of freedom until the receiving element 206 reaches a nominal position. At the nominal position, the receiving element 206 and the module 204 received thereby are configured (1712) to face substantially up when they are flipped down via the joint 212 at the second degree of freedom of motion. In some implementations, the module is assembled (1714) onto the receiving element 206 to form a module assembly. When the module includes a camera module 204, a camera assembly is formed to support the camera module 204 assembled onto the receiving element 206.

In some implementations, the stand assembly packaging method 1600 further includes flipping the receiving element 206 via the joint 212 at the second degree of freedom of motion until the receiving element 206 and the module 204 received thereby face substantially up. After the receiving element 406 is flipped via the joint 212, the assembly is placed within a shipping package. Specifically, the assembly is placed on a packaging layer (e.g., the layer 1406) inside the shipping package with the receiving element 206 and the module 204 received thereby at least partially held in a recess (e.g., the recess 1412) on the packaging layer. More details on a packaging process 1400 for packaging an assembly and its accessories in a multilayer shipping package are explained above with reference to FIGS. 14A-14F.

It should be understood that the particular order in which the operations in FIG. 17 have been described are merely exemplary and are not intended to indicate that the described order is the only order in which the operations can be performed. One of ordinary skill in the art would recognize various ways to package a stand assembly 202 as described herein. Additionally, it should be noted that details of other processes described herein with respect to method 1700 (e.g., FIG. 17) are also applicable in an analogous manner to method 1600 described above with respect to FIG. 16. For brevity, these details are not repeated here.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first fastener structure can be termed a second fastener structure, and, similarly, a second fastener structure can be termed a first fastener structure, without departing from the scope of the various described implementations. The first fastener structure and the second fastener structure are both fastener structures, but they are not the same fastener structure.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this specification, specify the presence of stated features, integers, steps, operations, elements, components, structures and/or groups, but do not preclude the presence or addition of one or more other features, integers, steps, operations, elements, components, structures, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

It is noted that the stand assemblies described herein are exemplary and are not intended to be limiting. For example, any dimensions, shapes, styles, and/or materials described herein are exemplary and are not intended to be limiting. Drawings are not to scale. For brevity, features or characters described in association with some implementations may not necessarily be repeated or reiterated when describing other implementations. Even though it may not be explicitly described therein, a feature or characteristic described in association with some implementations may be used by other implementations.

What is claimed is:

1. A camera system, comprising:
    a camera module having a lens system and a front opening arranged along a central axis, the lens system being configured to receive light from a field of view via the front opening;
    a module holding structure for holding the camera module, the module holding structure having a cross section including a circular portion and an extended portion, the circular portion having a first diameter, the central axis passing and being substantially perpendicular to the circular portion, the extended portion extending from the circular portion to an end;
    a base for supporting the camera module, the base including a base portion that is shaped to rest against a supporting surface via a planar surface, the base portion of the base being physically coupled to the end of the extended portion via a joint;
    wherein the camera module has a first degree of freedom of motion and a second degree of freedom of motion with respect to the base, the first degree of freedom of motion being associated with twisting of the camera module with respect to a twisting axis that passes through the extended portion and is perpendicular to the planar surface of the base portion, the second degree of freedom of motion being associated with flipping of the camera module with respect to a flipping axis that passes through the joint and is substantially parallel to the planar surface of the base portion.

2. The camera system of claim 1, wherein movement of the camera module at the first degree of freedom has substantially consistent resistance through first part of a first full range of motion associated with the first degree of freedom of motion.

3. The camera system of claim 1, further comprising:
    a first fastener structure coupled to the end of the extended portion; and
    a second fastener structure coupled to the base at the joint, the second fastener structure being configured to mate with the first fastener structure and enable the first and second degrees of freedom of the camera module.

4. The camera system of claim 3, wherein the first and second fastener structures are entirely embedded within and covered by part of the module holding structure that corresponds to the extended portion of the cross section.

5. The camera system of claim 3, wherein the first fastener structure is structurally invisible to a user of the camera system, and the joint is structurally visible to the user of the camera system.

6. The camera system of claim 2, wherein the first part of the first full range of motion associated with the first degree of freedom of motion is associated with a twisting angle that is substantially equal to 90 degrees.

7. The camera system of claim 1, wherein the extended portion of the cross section of the module holding structure has a width, and the width decreases with its distance from the central axis that passes the circular portion of the cross section of the module holding structure.

8. The camera system of claim 1, wherein the extended portion of the cross section of the module holding structure has a width that is less than the first diameter of the circular portion of the cross section of the module holding structure.

9. The camera system of claim 1, wherein movement of the camera module at the second degree of freedom has substantially consistent resistance through a second full range of motion associated with the second degree of freedom.

10. The camera system of claim 1, wherein movement of the camera module at the first degree of freedom is unlimited in a first direction of travel associated with the first degree of freedom.

11. The camera system of claim 10, further comprising:
a first fastener structure coupled to the end of the extended portion; and
a second fastener structure coupled to the base at the joint, the second fastener structure being configured to mate with the first fastener structure and enable the first and second degrees of freedom of the camera module;
wherein the first degree of freedom is associated with a reverse direction of travel that is opposite to the first direction of travel associated with the movement at the first degree of freedom, and the first and second fastener structures are unfastened when the camera module moves with respect to the base in the reverse direction of travel associate with the first degree of freedom.

12. The camera system of claim 1, further comprising:
a mounting structure that is configured to be attached and fixed onto the supporting surface using one or more mounting fasteners, wherein at least part of the mounting structure is made of magnetically attractable material, and the camera module is mounted onto the supporting surface when the base magnetically couples to the mounting structure.

13. The camera system of claim 1, wherein the module holding structure is configured to reach a flat position after being rotated in both a first direction associated with the first degree of freedom and a second direction associated with the second degree of freedom, and the camera system is configured to be physically received by a package when the module holding structure is disposed at the flat position.

14. The camera system of claim 13, wherein at the flat position, the module holding structure is configured to orient the front opening of the camera module substantially upward and hold the cross section in parallel with the supporting surface when the base portion rests against the supporting surface.

15. The camera system of claim 1, wherein the camera module further includes an ambient light detector that is configured to sense availability or intensity of ambient light for implementing at least one of a group of operations consisting of:
controlling parameters of the lens system, enhancing image processing of a captured image, and enabling an alternative illumination mode.

16. The camera system of claim 1, further comprising a connection port to which a connection plug is able to be coupled to support power or transfer data for the camera module.

17. The camera system of claim 1, wherein the camera module further includes wireless transceiver circuit and one or more antennas, and is configured to exchange data to a server system.

18. The camera system of claim 1, wherein the camera module is associated with a software application that is configured to enable a user interface for display on a client device, and video data captured by the camera module is configured to be reviewed remotely on the user interface of the software application.

19. The camera system of claim 1, wherein the twisting axis is located on the cross section of the module holding structure, and the central axis is perpendicular to the twisting axis.

20. The camera system of claim 1, wherein the planar surface has a second diameter that is larger than the first diameter of the circular portion of the cross section of the module holding structure.

\* \* \* \* \*